(12) United States Patent
Papasakellariou

(10) Patent No.: US 11,832,254 B2
(45) Date of Patent: Nov. 28, 2023

(54) POWER HEADROOM REPORT TYPES AND TRIGGERING CONDITIONS

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 17/447,922

(22) Filed: Sep. 16, 2021

(65) Prior Publication Data

US 2022/0104239 A1    Mar. 31, 2022

Related U.S. Application Data

(60) Provisional application No. 63/084,126, filed on Sep. 28, 2020.

(51) Int. Cl.
*H04W 72/20* (2023.01)
*H04W 72/1263* (2023.01)
(Continued)

(52) U.S. Cl.
CPC .......... *H04W 72/20* (2023.01); *H04L 5/0048* (2013.01); *H04W 52/365* (2013.01); *H04W 72/1263* (2013.01); *H04W 72/569* (2023.01)

(58) Field of Classification Search
CPC ... H04L 5/0044; H04L 5/0048; H04L 5/0053; H04L 5/0094; H04W 52/365; H04W 72/1263; H04W 72/20; H04W 72/569
See application file for complete search history.

(56) References Cited

U.S. PATENT DOCUMENTS

2016/0029239 A1* 1/2016 Sadeghi .............. H04W 52/244
370/252
2020/0305092 A1    9/2020 Chen et al.
(Continued)

FOREIGN PATENT DOCUMENTS

WO    2020191274 A1    9/2020

OTHER PUBLICATIONS

"5G; NR; Physical channels and modulation (3GPP TS 38.211 version 16.2.0 Release 16)", ETSI TS 138 211 V16.2.0, Jul. 2020, 136 pages.

(Continued)

*Primary Examiner* — Pao Sinkantarakorn

(57) ABSTRACT

Methods and apparatuses for power headroom report types and triggering conditions. A method for a user equipment (UE) to provide first uplink control information (UCI) includes receiving a configuration enabling transmissions of physical uplink control channels (PUCCHs) and physical uplink shared channels (PUSCHs) that overlap in time and determining a first priority for a first PUCCH and a second priority for a first PUSCH. Transmissions of the first PUCCH and of the first PUSCH are scheduled to overlap in time. The first PUCCH is scheduled to provide the first UCI. The method further includes transmitting: both the first PUCCH and the first PUSCH when the first priority is different than the second priority, where the first UCI is included in the first PUCCH; and only the first PUSCH when the first priority is same as the second priority, where the first UCI is included in the first PUSCH.

20 Claims, 12 Drawing Sheets

(51) Int. Cl.
*H04L 5/00* (2006.01)
*H04W 52/36* (2009.01)
*H04W 72/566* (2023.01)

(56) References Cited

U.S. PATENT DOCUMENTS

| | | | | |
|---|---|---|---|---|
| 2021/0243779 | A1* | 8/2021 | Takeda | H04W 72/23 |
| 2021/0259010 | A1* | 8/2021 | Yang | H04W 72/569 |
| 2022/0060998 | A1* | 2/2022 | Khoshnevisan | H04W 52/365 |
| 2022/0095324 | A1* | 3/2022 | Huang | H04W 72/566 |
| 2022/0346086 | A1* | 10/2022 | Aiba | H04L 5/0094 |

OTHER PUBLICATIONS

"5G; NR; Multiplexing and channel coding (3GPP TS 38.212 version 16.2.0 Release 16)", ETSI TS 138 212 V16.2.0, Jul. 2020, 154 pages.

"5G; NR; Physical layer procedures for control (3GPP TS 38.213 version 16.2.0 Release 16)", ETSI TS 138 213 V16.2.0, Jul. 2020, 180 pages.

"5G; NR; Physical layer procedures for data (3GPP TS 38.214 version 16.2.0 Release 16)", ETSI TS 138 214 V16.2.0, Jul. 2020, 167 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

"5G; NR; Medium Access Control (MAC) protocol specification (3GPP TS 38.321 version 16.1.0 Release 16)", ETSI TS 138 321 V16.1.0, Jul. 2020, 153 pages.

International Search Report of the International Searching Authority dated Dec. 10, 2021, in connection with International Application No. PCT/KR2021/013112, 4 pages.

Vivo, "Discussion on PUSCH skipping with overlapping UCI on PUCCH," R1-2005327, 3GPP TSG RAN WG1 #102-e, Aug. 17-28, 2020, 8 pages.

ZTE, "Discussion on determining PHR for PUSCH in CA," R1-2005493, 3GPP TSG RAN WG1 Meeting #102-e, Aug. 17-28, 2020, 6 pages.

\* cited by examiner

POWER HEADROOM REPORT TYPES AND TRIGGERING CONDITIONS

CROSS-REFERENCE TO RELATED APPLICATION AND CLAIM OF PRIORITY

This application claims priority under 35 U.S.C. § 119(e) to U.S. Provisional Patent Application No. 63/084,126 filed on Sep. 28, 2020. The above-identified provisional patent application is hereby incorporated by reference in its entirety.

TECHNICAL FIELD

The present disclosure relates generally to wireless communication systems and, more specifically, the present disclosure relates to power headroom report (PHR) types and triggering conditions.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to PHR types and triggering conditions.

In one embodiment, a method for a user equipment (UE) to provide first uplink control information (UCI) is provided. The method includes receiving a configuration enabling transmissions of physical uplink control channels (PUCCHs) and physical uplink shared channels (PUSCHs) that overlap in time and determining a first priority for a first PUCCH and a second priority for a first PUSCH. Transmissions of the first PUCCH and of the first PUSCH are scheduled to overlap in time. The first PUCCH is scheduled to provide the first UCI. The method further includes transmitting: both the first PUCCH and the first PUSCH when the first priority is different than the second priority, where the first UCI is included in the first PUCCH; and only the first PUSCH when the first priority is same as the second priority, where the first UCI is included in the first PUSCH.

In another embodiment, a UE is provided. The UE includes a transceiver configured to receive a configuration enabling transmissions of PUCCHs and PUSCHs that overlap in time. The UE further includes a processor operably coupled to the transceiver. The processor is configured to determine a first priority for a first PUCCH and a second priority for a first PUSCH. Transmissions of the first PUCCH and of the first PUSCH are scheduled to overlap in time. The first PUCCH is scheduled to provide the first UCI. The transceiver is further configured to transmit: both the first PUCCH and the first PUSCH when the first priority is different than the second priority, where first UCI is included in the first PUCCH; and only the first PUSCH when the first priority is same as the second priority, where the first UCI is included in the first PUSCH.

In yet another embodiment, a base station is provided. The base station includes a transceiver configured to transmit a configuration enabling receptions of PUCCHs and PUSCHs that overlap in time. The base station further includes a processor operably coupled to the transceiver. The processor is configured to determine a first priority for a first PUCCH and a second priority for a first PUSCH. Receptions of the first PUCCH and of the first PUSCH are scheduled to overlap in time. The first PUCCH is scheduled to provide the first UCI. The transceiver is further configured to receive: both the first PUCCH and the first PUSCH when the first priority is different than the second priority, where first uplink control information (UCI) is included in the first PUCCH; and only the first PUSCH when the first priority is same as the second priority, where the first UCI is included in the first PUSCH.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
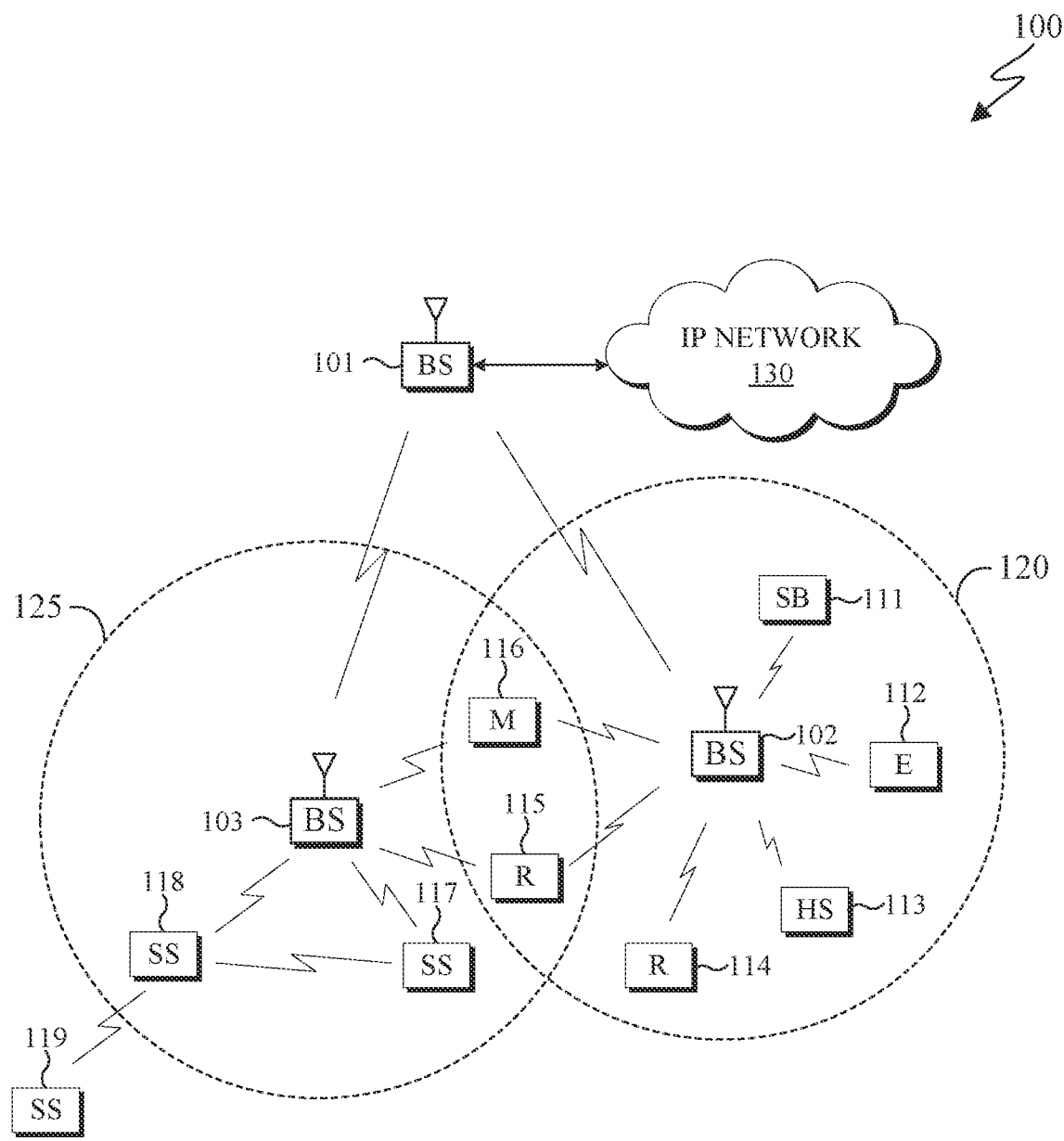
FIG. 1 illustrates an example wireless network according to embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: (i) 3GPP TS 38.211 v16.2.0, "NR; Physical channels and modulation;" (ii) 3GPP TS 38.212 v16.2.0, "NR; Multiplexing and Channel coding;" (iii) 3GPP TS 38.213 v16.2.0, "NR; Physical Layer Procedures for Control;" (iv) 3GPP TS 38.214 v16.2.0, "NR; Physical Layer Procedures for Data;" (v) 3GPP TS 38.321 v16.1.0, "NR; Medium Access Control (MAC) protocol specification;" and (vi) 3GPP TS 38.331 v16.1.0, "NR; Radio Resource Control (RRC) Protocol Specification.".

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

The present disclosure relates generally to wireless communication systems and, more specifically, to identifying required PHR types and corresponding triggering conditions. This disclosure also relates to supporting simultaneous transmission of data channels and control channels from a UE. The data channels and the control channels can have same or different priorities and be transmitted to same or different reception points.

Figure 2:
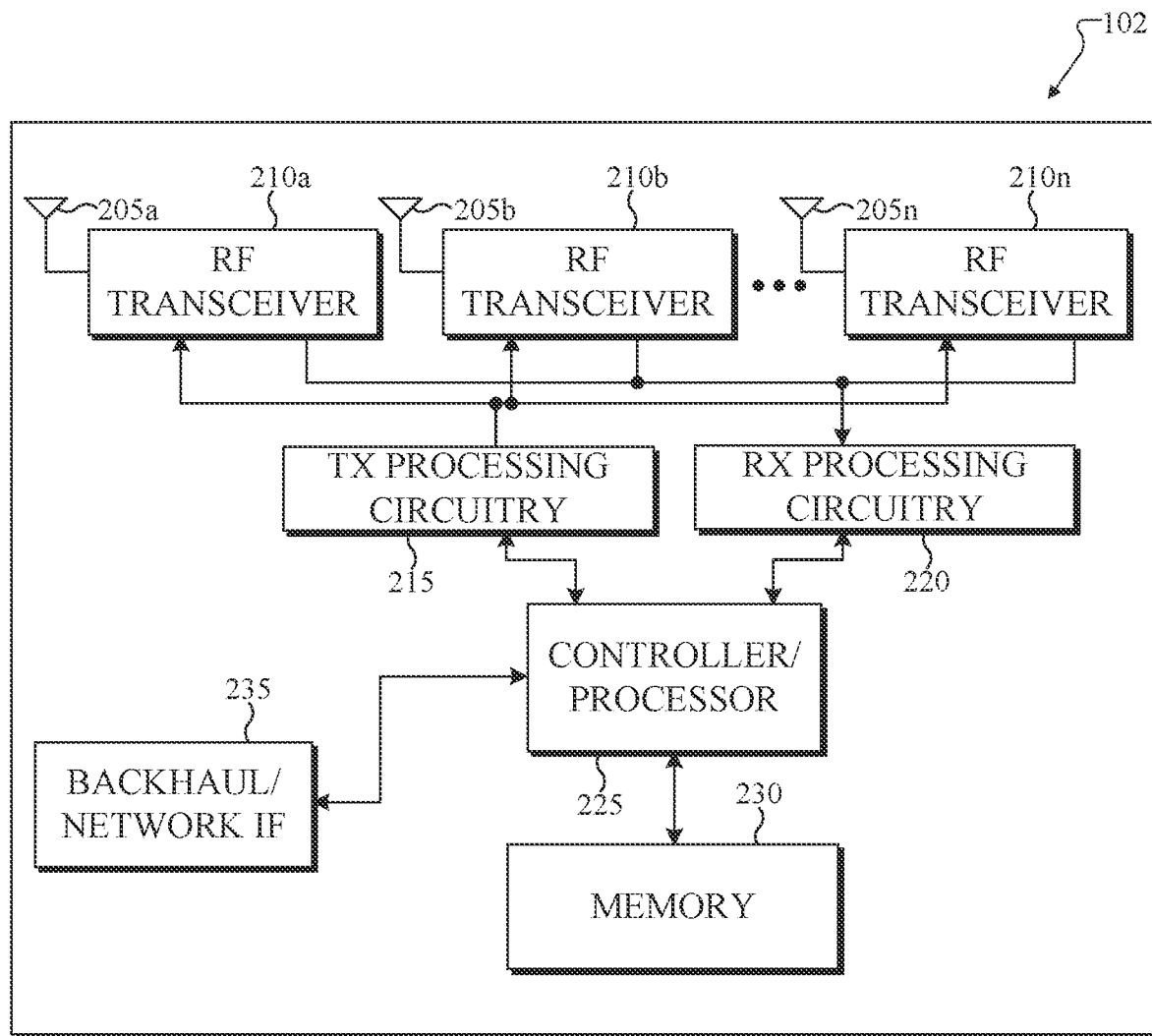
FIG. 2 illustrates an example base station (BS) according to embodiments of the present disclosure.
Figure 3:
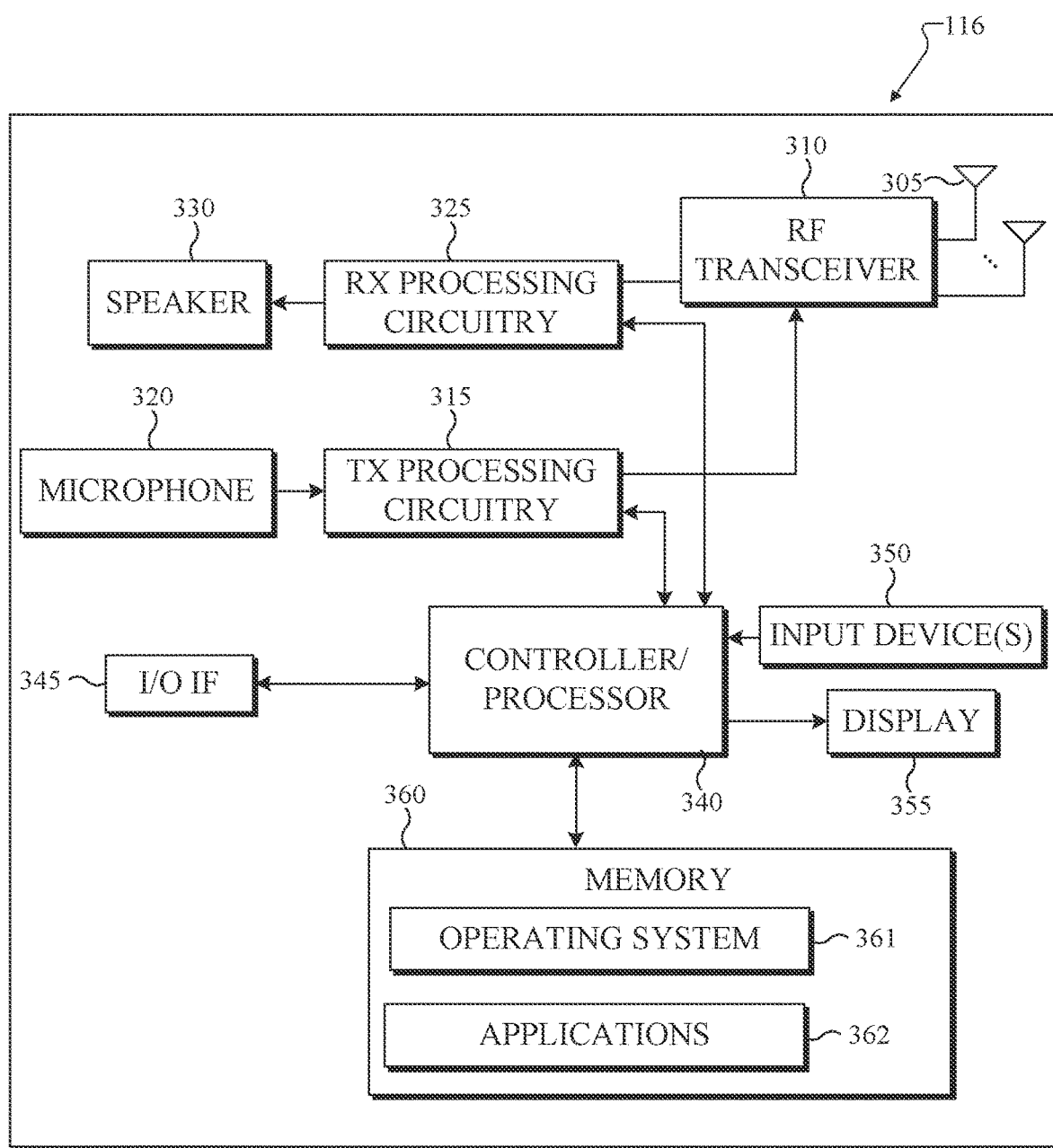
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-118 using 5G/NR, long term evolution (LTE), long term evolution-advanced (LTE-A), WiMAX, WiFi, or other wireless communication techniques.

In certain embodiments, multiple UEs (such as the UE 117, the UE 118, and the UE 119) may communicate directly with each other through device-2-device communication. In some embodiments, a UE, such as UE 119, is outside the coverage area of the network, but can communicate with other UEs inside the coverage area of the network, such as UE 118, or outside the coverage area of the network.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-119 include circuitry, programing, or a combination thereof for using PHR types and reporting based on triggering conditions. In certain embodiments, and one or more of the BSs 101-103 includes circuitry, programing, or a combination thereof for receiving reporting according to PHR types and triggering conditions.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support PHR types and triggering conditions. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities, such as web real time communications (RTC). For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of downlink channel signals and the transmission of uplink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
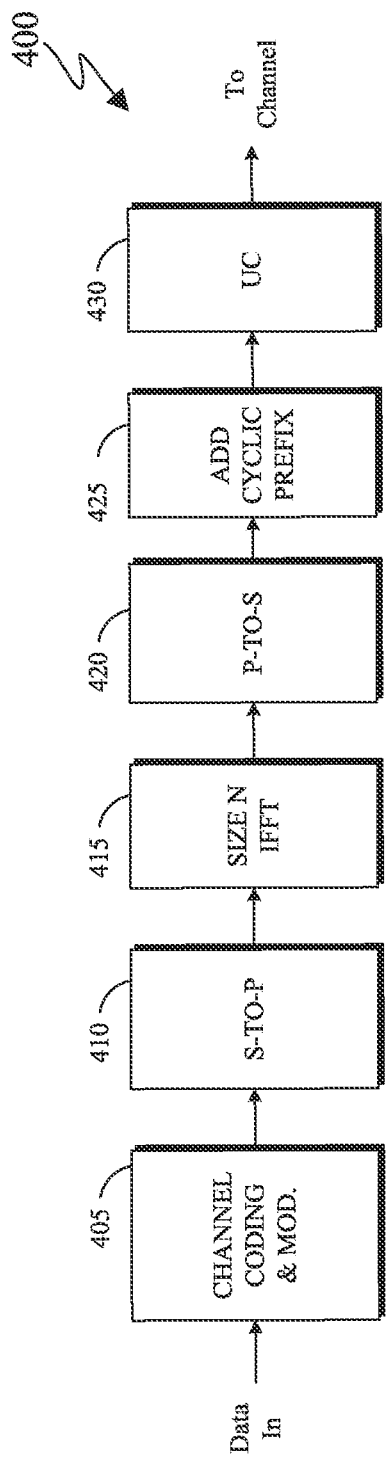
FIGS. 4 and 5 illustrate example wireless transmit and receive paths according to embodiments of the present disclosure.
Figure 5:
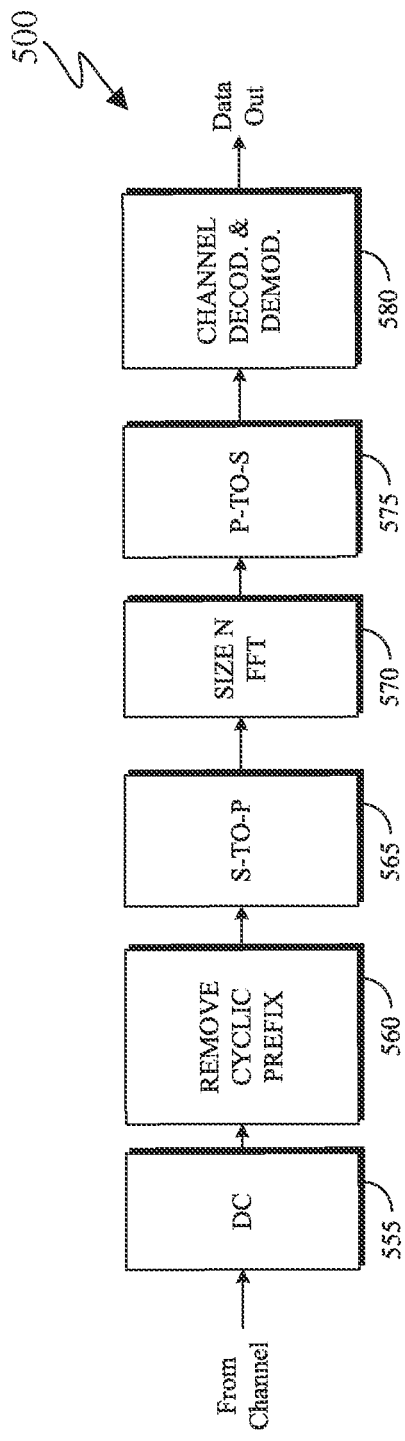

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the transmit path 400 is configured to report according to support PHR types and triggering conditions and the receive path 500 is configured to receiving reportings according to support PHR types and triggering conditions as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-118. Similarly, each of UEs 111-118 may implement the transmit path 400 for transmitting in the uplink to the BSs 101-103 and may implement the receive path 500 for receiving in the downlink from the BSs 101-103.

Furthermore, each of the UEs 111-119 may implement a transmit path 400 for transmitting in the sidelink to another one of the UEs 111-119. Similarly, each of the UEs 111-119 may implement a receive path 500 for receiving in the sidelink from another one of the UEs 111-119.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for downlink (DL) signaling or for uplink (UL) signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration $\mu$ as $2^\mu \cdot 15$ kHz. A unit of one sub-carrier over one symbol is referred to as a resource element (RE). A unit of one RB over one symbol is referred to as a physical RB (PRB).

DL signals include data signals conveying information content, control signals conveying DL control information (DCI), reference signals (RS), and the like that are also known as pilot signals. A BS (such as the BS 102) transmits data information or DCI through respective physical DL shared channels (PDSCHs) or physical DL control channels (PDCCHs). A PDSCH or a PDCCH can be transmitted over a variable number of slot symbols including one slot symbol.

A BS transmits one or more of multiple types of RS including channel state information RS (CSI-RS) and demodulation RS (DM-RS). A CSI-RS is intended for UEs (such as the UE 116) to perform measurements and provide channel state information (CSI) to a BS. For channel measurement or for time tracking, non-zero power CSI-RS (NZP CSI-RS) resources can be used. For interference measurement reports (IMRs), CSI interference measurement (CSI-IM) resources can be used. The CSI-IM resources can also be associated with a zero power CSI-RS (ZP CSI-RS) configuration. A UE can determine CSI-RS reception parameters through DL control signaling or higher layer signaling, such as radio resource control (RRC) signaling from a gNB. A DM-RS is typically transmitted within a BW of a respective PDCCH or PDSCH and a UE can use the DM-RS to demodulate data or control information.

UL signals also include data signals conveying information content, control signals conveying UCI, DM-RS associated with data or UCI demodulation, sounding RS (SRS) enabling a gNB to perform UL channel measurement, and a random access (RA) preamble enabling a UE (such as the UE 116) to perform random access. A UE transmits data information or UCI through a respective PUSCH or a PUCCH. A PUSCH or a PUCCH can be transmitted over a variable number of slot symbols including one slot symbol. When a UE simultaneously transmits data information and UCI, the UE can multiplex both in a PUSCH or, depending on a UE capability, transmit both a PUSCH with data information and a PUCCH with UCI at least when the transmissions are on different cells.

UCI includes hybrid automatic repeat request (HARD) acknowledgement (ACK) information, indicating correct or incorrect detection of data transport blocks (TBs) or of code block groups (CBGs) in a PDSCH, scheduling request (SR) indicating whether a UE has data in its buffer to transmit, and CSI reports enabling a gNB to select appropriate parameters for PDSCH or PDCCH transmissions to a UE. A CSI report can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, of a CSI-RS resource indicator (CRI) used to obtain the CSI report, and of a rank indicator (RI) indicating a transmission rank for a PDSCH.

In certain embodiments, UL RS includes DM-RS and phase tracking RS (PT-RS). DM-RS is typically transmitted within a BW of a respective PUSCH or PUCCH. A gNB can use a DM-RS to demodulate information in a respective PUSCH or PUCCH. A UE can use a PT-RS to track a phase of a received signal, particularly for operation in a frequency range above 6 GHz. SRS is transmitted by a UE to provide a gNB with an UL CSI and, for a time division duplexing (TDD) system, to also provide a PMI for DL transmission. Further, as part of a random access procedure or for other purposes, a UE can transmit a physical random access channel (PRACH).

A UE can generate hybrid automatic repeat request acknowledgement (HARQ-ACK) information in response to (i) reception of TBs/CBGs in a PDSCH, (ii) a detection of a DCI format indicate release of a semi-persistently scheduled PDSCH, (iii) a detection of a DCI format indicating a change of an active bandwidth part (BWP) to a dormant BWP or to a non-dormant BWP for secondary cells, and (iv) the like. For brevity, the reasons for a UE to generate HARQ-ACK information will generally not be mentioned in the following and, when needed, only PDSCH receptions will be referred to.

DL transmissions and UL transmissions can be based on an orthogonal frequency division multiplexing (OFDM) waveform including a variant using DFT preceding that is known as DFT-spread-OFDM.

Figure 6:
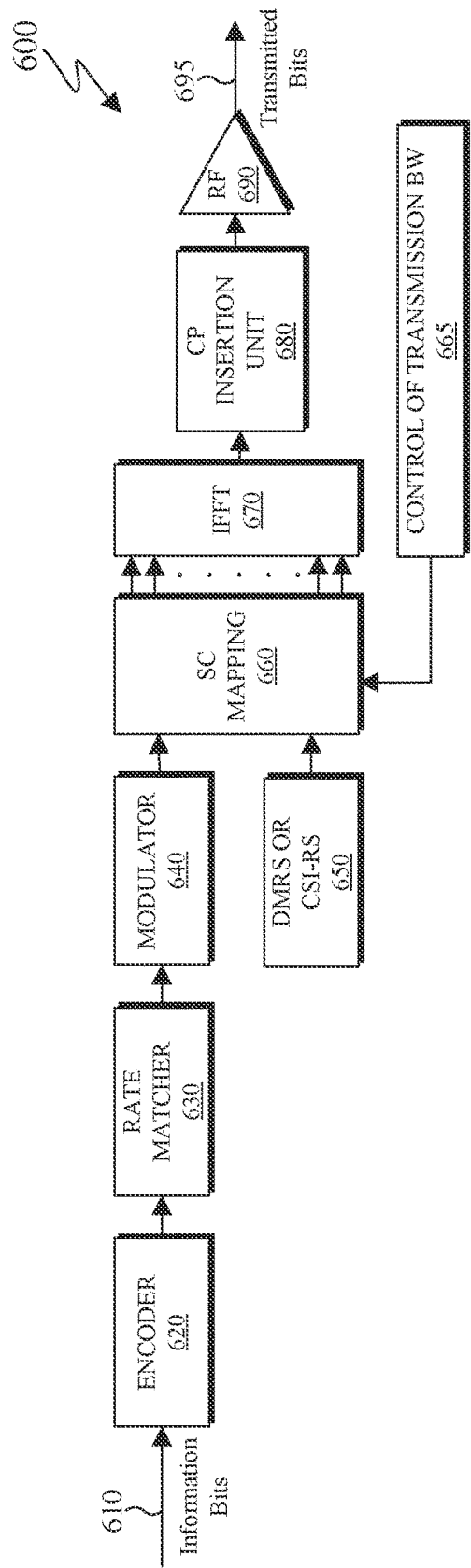
FIG. 6 illustrates a block diagram of an example transmitter structure using orthogonal frequency division multiplexing (OFDM) according to embodiments of the present disclosure.
Figure 7:
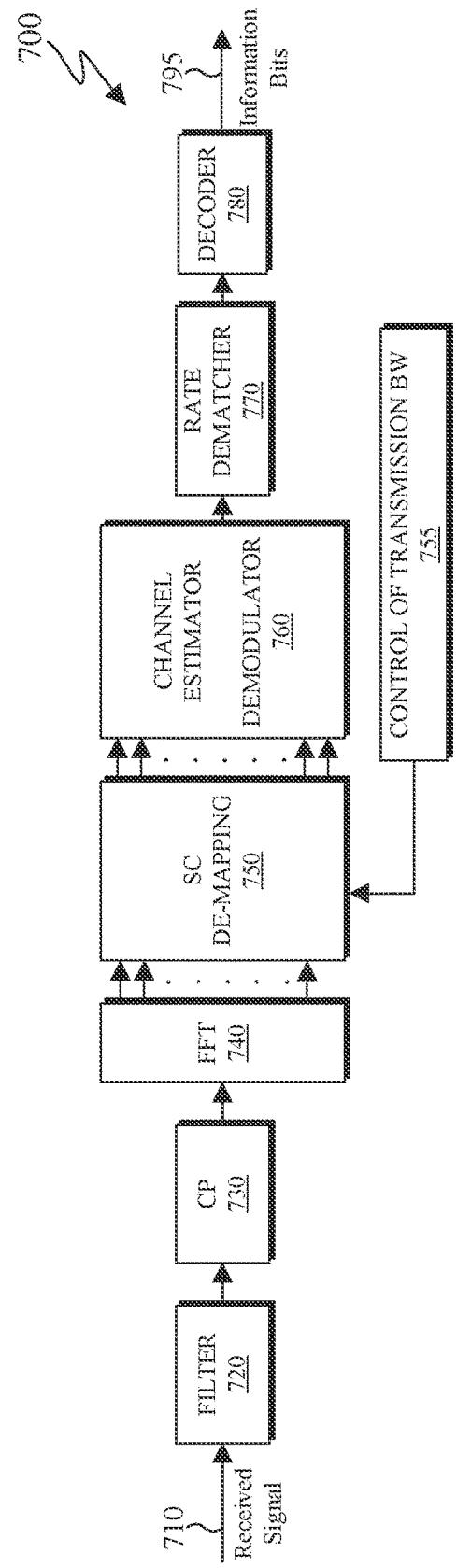
FIG. 7 illustrates a block diagram of an example receiver structure using OFDM according to embodiments of the present disclosure.

FIG. 6 illustrates a block diagram 600 of an example transmitter structure using orthogonal frequency division multiplexing (OFDM) according to embodiments of the present disclosure. FIG. 7 illustrates a block diagram 700 of an example receiver structure using OFDM according to embodiments of the present disclosure.

The transmitter structure as shown in the block diagram 600 and the receiver structure as shown in the block diagram 600 can be similar to transmitters and receivers in the RF transceivers 210a-210n of FIG. 2 and the RF transceiver 310 of FIG. 3. The example block diagram 600 of FIG. 6 and the block diagram 700 of FIG. 7 are for illustration only and other embodiments can be used without departing from the scope of the present disclosure.

As illustrated in the block diagram 600, information bits 610, such as DCI bits or data bits, are encoded by encoder 620, rate matched to assigned time/frequency resources by rate matcher 630 and modulated by modulator 640. Subsequently, modulated encoded symbols and demodulation reference signal (DMRS) or CSI-RS 650 are mapped to SCs by SC mapping unit 660 with input from BW selector unit 665, an inverse fast Fourier transform (IFFT) is performed by filter 670, a cyclic prefix (CP) is added by CP insertion unit 680, and a resulting signal is filtered by filter 690 and transmitted by a radio frequency (RF) unit as transmitted bits 695.

As illustrated in the block diagram 700, a received signal 710 is filtered by filter 720, a CP removal unit 730 removes a CP, a filter 740 applies a fast Fourier transform (FFT), SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

If a UE (such as the UE 116) transmits a PUSCH on active UL BWP b of carrier f of serving cell c using parameter set configuration with index j and PUSCH power control adjustment state with index l, the UE determines the PUSCH transmission power $P_{PUSCH,b,f,c}(i,j,q_d,l)$ in PUSCH transmission occasion i as described in Equation (1).

$$P_{PUSCH,b,f,c}(i,j,q_d,l) = \min(P_{CMAX,f,c}(i), P_{O\_PUSCH,b,f,c}(j) + 10\log_{10}(2^\mu \cdot M_{RB,f,c}^{PUSCH}(i)) + \alpha_{b,f,c}(j) \cdot PL_{b,f,c}(q_d) + \Delta_{TF,b,f,c}(i) + f_{b,f,c}(i,l))[dBm] \quad (1)$$

Here, the parameter $P_{CMAX,f,c}(i)$ is a UE configured maximum output power. The parameter $P_{O\_PUSCH,b,f,c}(j)$ is a nominal received power value provided by higher layers and $\alpha_{b,f,c}(j)$ is a path-loss compensation factor with j=0 for a PUSCH transmission during initial system access or if the UE is not provided UE-specific parameter values for $P_{O\_PUSCH,b,f,c}$ or $\alpha_{b,f,c}(j)$, respectively, j=1 for a configured grant (CG) PUSCH transmission, and j≥2 for a PUSCH transmission scheduled by a DCI format. The parameter $M_{RB,b,f,c}^{PUSCH}(i)$ is a number of RBs for the PUSCH transmission using SCS configuration μ. The parameter $PL_{b,f,c}(q_d)$ is a DL path-loss estimate calculated by the UE using reference signal (RS) index $q_d$. The parameter $\Delta_{TF,b,f,c}(i)$ adjusts the power based on the spectral efficiency of the PUSCH transmission. The parameter $f_{b,f,c}(i, 1)$ is a CLPC adjustment state for the PUSCH based on accumulation of TPC commands for the PUSCH that are provided by DCI formats and l is an index of the adjustment state in case of multiple, such as two, adjustment states.

If a UE transmits a PUCCH on active UL BWP b of carrier f of serving cell c, such as the primary cell, using parameter set configuration with index $q_u$ and PUCCH power control adjustment state with index l, the UE determines the PUSCH transmission power $P_{PUCCH,b,f,c}(i,q_u,q_d,l)$ in PUCCH transmission occasion i as described in Equation (2).

$$P_{PUCCH,b,f,c}(i,q_u,q_d,l) = \min(P_{CMAX,f,c}(i), P_{O\_PUCCH,b,f,c}(q_u) + 10\log_{10}(2^\mu \cdot M_{RB,f,c}^{PUCCH}(i)) + PL_{b,f,c}(q_d) + \Delta_{F\_PUCCH}(F) + \Delta_{TF,b,f,c}(i) + g_{b,f,c}(i,l))[dBm] \quad (2)$$

Here, the parameter $P_{CMAX,f,c}(i)$ is a UE configured maximum output power. The parameter $P_{O\_PUCCH,b,f,c}(q_u)$ is a nominal received power value provided by higher layers and $q_u$ is a spatial relation index. The parameter $M_{RB,f,c}^{PUCCH}(i)$ is a number of RBs for the PUCCH transmission using SCS configuration $\mu$. The parameter $PL_{b,f,c}(q_d)$ is a DL path-loss estimate calculated by the UE using RS index $q_d$. The parameter $\Delta_{F\_PUCCH}(F)$ depends on the PUCCH format used for the PUCCH transmission and other parameters. The parameter $\Delta_{TF,b,f,c}(i)$ adjusts the power based on the spectral efficiency of the PUCCH transmission. The parameter $g_{b,f,c}(i,l)$ is a CLPC adjustment state for the PUCCH based on accumulation of TPC commands for the PUCCH that are provided by DCI formats and l is an index of the adjustment state in case of multiple, such as two, adjustment states.

For the determination of a power for a PUSCH transmission and for a PUCCH transmission, the following hold three criteria hold. First, path-loss $PL_{b,f,c}(q_d)$ used for determining a PUSCH transmission power can be different than a path-loss $PL_{b,f,c}(q_d)$ used for determining a PUCCH transmission power as a corresponding RS index $q_d$ can be different. Second, PUSCH can have partial path-loss compensation, when $\alpha_{b,f,c}(j)<1$, while PUCCH always has full path-loss compensation. Third, a CLPC adjustment state used for determining a PUSCH transmission power can be different than a $f_{b,f,c}(i,l)$.

In certain embodiments, a UE provides a PHR for an activated cell to a serving gNB to enable the serving gNB to estimate a power availability at the UE and accordingly perform link adaptation for transmissions from the UE. A PHR report can be actual one that is computed based on an actual transmission from a UE or a virtual one determined based on a reference configuration for a transmission.

A UE determines an actual PHR for a PUSCH transmission, referred to as actual Type-1 PHR, as described in Equation (3). Additionally, a UE determines a virtual PHR for a PUSCH transmission, referred to as virtual Type-1 PHR, as described in Equation (4).

$$PH_{type1,b,f,c}(i,j,q_d,l) = P_{CMAX,f,c}(i) - (P_{O\_PUSCH,b,f,c}(j) + 10\log_{10}(2^\mu \cdot M_{RB,f,c}^{PUSCH}(i)) + \alpha_{b,f,c}(j) \cdot PL_{b,f,c}(q_d) + \Delta_{TF,b,f,c}(i) + f_{b,f,c}(i,l))[dB] \quad (3)$$

$$PH_{type1,b,f,c}(i,j,q_d,l) = \tilde{P}_{CMAX,f,c}(i) - (P_{O\_PUSCH,b,f,c}(j) + \alpha_{b,f,c}(j) \cdot PL_{b,f,c}(q_d) + f_{b,f,c}(i,l))[dB] \quad (4)$$

Here, $\tilde{P}_{CMAX,f,c}(i)$ is computed assuming that each of a maximum power reduction (MPR), an adaptive MPR (A-MPR), and a power management MPR (P-MPR) for the PUSCH transmission is 0 dB. The parameters $P_{O\_PUSCH,b,f,c}(j)$ and $\alpha_{b,f,c}(j)$ are obtained using corresponding reference values. The parameter $PL_{b,f,c}(q_d)$ is obtained from a path-loss reference RS with index 0 for the PUSCH, and l=0 for $f_{b,f,c}(i,l)$.

Embodiments of the present disclosure take into consideration that NR does not currently support a PHR report for the PUCCH. One possible reason is because NR does not currently support simultaneous PUSCH and PUCCH transmissions on cells of a same cell group although such support would be required for PUSCH transmission on a cell of one cell group and a PUCCH transmission on a cell, such as a primary cell, of another cell group. Also, reliance on virtual type-1 PHR to derive a power headroom for the PUCCH is not generally possible as the UE can be using a different path loss value $PL_{b,f,c}(q_d)$ or a different CLPC adjustment state index l to determine a power for a PUSCH transmission and for a PUCCH transmission and, even if the UE uses a same $PL_{b,f,c}(q_d)$ and a same l, it is not generally possible to derive $PL_{b,f,c}(q_d) + g_{b,f,c}(i,l)$ from $\alpha_{b,f,c}(j) \cdot PL_{b,f,c}(q_d) + f_{b,f,c}(i,l)$ even if $\alpha_{b,f,c}(j)=1$ as the UE uses TPC commands in different DCI formats to derive $f_{b,f,c}(i,l)$ and $g_{b,f,c}(i,l)$ and the UE may fail to detect some of the DCI formats. Further, conditions for triggering a PHR may not be same for a PUSCH transmission and for a PUCCH transmission as, for example, a UE may not use a same $PL_{b,f,c}(q_d)$ for the determination of a PUSCH transmission power and for the determination of a PUCCH transmission power. Therefore, it is possible that a UE can be power limited for PUCCH transmission and not be able to provide a corresponding PHR to a serving gNB regardless of whether or not the UE provides a PHR for a PUSCH transmission on a serving cell.

In certain embodiments, a PHR is triggered under several individual conditions that include an activation of an SCell having an active DL BWP that is not a dormant DL BWP or a change of an active DL BWP from dormant BWP to non-dormant DL BWP of an SCell. A functionality of a DL dormant BWP for an activated SCell is to enable UE power savings as the UE does not need to monitor PDCCH on the SCell when the active BWP for the UE on the SCell is the dormant BWP. A similar functionality is provided by deactivating an SCell although it typically requires a longer time to activate the SCell and schedule the UE than it does to change the active DL BWP to a non-dormant DL BWP and schedule the UE. Both functionalities can be provided by a DCI format where a field in a DCI format can indicate to the UE whether to change an active dormant or non-dormant DL BWP to a non-dormant or dormant DL BWP, respectively, or a field in a DCI format can indicate to the UE whether to activate or deactivate a deactivated or activated SCell, respectively. In order to increase UE power savings, an adaptation of the active DL BWP for the UE on an SCell to a dormant or non-dormant one or an adaptation of SCell to an activated or deactivated one can occur according to a data buffer size for the UE at the serving gNB and a timescale for such variations can be much smaller than a timescale of a path-loss change. Also, a change in the active DL BWP for a UE on an SCell to a dormant or non-dormant one, or an activation or deactivation for an SCell, is not correlated with a change in the path-loss in order to require a PHR. Therefore, a small timescale of an active DL BWP change for a UE on an SCell between dormant and non-dormant or of a change to a SCell status between activated and deactivated can typically result to a large unnecessary UL overhead from the UE having to report PHR for the SCells that provides little or no useful information to a serving gNB.

Changing an active DL BWP for an SCell of a UE between a non-dormant BWP and a dormant BWP can result in a serving gNB receiving or not receiving transmissions from the UE during corresponding time periods. Similarly, changing the status for an SCell of the UE between activated and deactivated, results in a serving gNB receiving or not receiving transmissions from the UE during corresponding time periods.

When the serving gNB does not receive any transmissions from the UE, the serving gNB has no means to determine a compensation for the UE transmission power on the SCell due to fading. Further the active DL BWP or UL BWP for a UE on an SCell after changing the active DL BWP on the SCell from dormant to non-dormant, or after activating the SCell, can be different that the active DL BWP or UL BWP before a change from non-dormant to dormant or before deactivating the SCell. Therefore, using a same CLPC adjustment state value $f_{b,f,c}(i,l)$ before a change of an active DL BWP for a UE on an SCell from non-dormant to dormant and after a change of an active DL BWP for the UE on the SCell from dormant to non-dormant, or before a deactivation of an SCell and after activation of the SCell, can lead to inaccurate PUSCH transmission power as a channel medium may be substantially unrelated between the two time instances depending on several factors such as a UE velocity, a carrier frequency, a time duration for the active DL BWP being the dormant DL BWP on the SCell or for SCell deactivation, and so on.

5G can support multiple service types, for a same UE or for different UEs, that require BLER targets for TBs or UCI types or require scheduling latencies that can be different by several orders of magnitude. Such service types are associated with different priority values. A UE needs to identify a priority value for a PDSCH reception or PUSCH/PUCCH transmission. When a PDSCH reception by or PUSCH/PUCCH transmission from a UE is scheduled by a DCI format, different DCI formats (with different sizes), or different radio network temporary identifiers (RNTIs) scrambling a CRC of each DCI format, or a priority indicator field in a DCI format can be used to indicate a corresponding priority value. When a PDSCH reception by or a PUSCH/PUCCH transmission from a UE is configured by higher layers, the configuration can include a corresponding priority value.

As used herein, the term "higher layers" is used to denote control information that a UE is provided in a PDSCH reception, such as RRC or a MAC control element (CE).

When a UE supports transmissions/receptions with different priorities, the UE may have to simultaneously transmit a first PUSCH or a first PUCCH associated having a first priority type and a second PUSCH or a second PUCCH having a second priority type. A priority type of a PUCCH or PUSCH transmission is equivalent with a priority value for TBs or UCI types that are multiplexed in the PUCCH or PUSCH transmission. In such case, the UE can transmit the PUCCH or PUSCH having the larger priority value and drop transmission of the PUCCH or PUSCH having the smaller priority value.

A UE that supports PUCCH or PUSCH transmissions having multiple priority values needs to determine a first set of parameters for a PUCCH or PUSCH transmission with a first priority value and be able to differentiate the first set of parameters from a second set of parameters for a PUCCH or PUSCH transmission with a second priority value. A reception point for PUCCH or PUSCH transmissions with different priority types from a UE may not always be same. For example, for a PUCCH or a PUSCH transmission associated with a service type that does not require minimizing a corresponding latency, more than one reception points can be used and can be connected with non-ideal backhaul that introduces some latency while for a PUCCH or a PUSCH transmission associated with a service type that requires minimizing a corresponding latency, one reception point can be used. The reverse can also be applicable, for example for a PUCCH transmission to multiple reception points in response to PDSCH receptions from respective multiple transmission points while a PUSCH transmission can be to a single reception point.

Further, for a service type that requires large reliability or low latency, a path-loss compensation factor $\alpha_{b,f,c}(j)$ can be set to one to reduce a probability for retransmissions while for a service type that can tolerate retransmissions in order to reduce intercell interference, the path-loss compensation factor can be smaller than one. It is also possible that different CLPC adjustment states or different TPC command values are used for different service types, for example due to transmissions to different reception points experiencing different channel mediums. Therefore, it may be difficult for a serving gNB to determine a PHR for a PUSCH or PUCCH transmission with a second priority value from a PHR for a PUSCH or PUCCH transmission with a first priority value.

In certain embodiments, for overlapping PUCCH or PUSCH transmissions from a UE, the UE first resolves an overlapping among PUCCH or PUSCH transmissions with same priority value to obtain a single PUCCH or PUSCH where all corresponding UCI for the priority value is multiplexed, when possible. Subsequently, the UE resolves an overlapping among PUCCH or PUSCH transmissions with different priorities. The UE drops an overlapping PUCCH or PUSCH transmission having a first (smaller) priority value. Resolution of overlapping among PUCCH or PUSCH transmissions is subject to processing timelines.

To avoid a spectral efficiency loss (resulting from dropped transmissions, such as a dropped PUCCH transmission with HARQ-ACK information for multiple PDSCH receptions that would require retransmission by a gNB of associated PDCCHs and of the PDSCHs), a UE can be configured to simultaneously transmit on cells of a cell group a PUCCH on a first cell, such as a primary cell, and one or more PUSCHs on second cells wherein the second cells may or may not include the first cell. However, simultaneous PUSCH and PUCCH transmissions are not always beneficial as they may require a power reduction by the UE in order to meet spectral emission requirements and the power reductions can depend on several parameters such as a location of the PUSCH and PUCCH transmissions on a cell bandwidth, a bandwidth separation of the PUCCH and PUSCH transmissions including whether on a same cell or on different cells, a different in power spectral density for the PUCCH and PUSCH transmissions, and so on.

Accordingly, embodiments of the present disclosure take into consideration that conditions need to be defined for a UE to determine when to multiplex UCI in a PUSCH transmission and when to simultaneously transmit a PUCCH and one or more PUSCHs.

Embodiments of the present disclosure also take into consideration that there is a need to define a power headroom report for a PUCCH transmission.

Embodiments of the present disclosure further take into consideration that there is a need to enable a UE to provide separate PHR for PUSCH or PUCCH transmissions with different priority types.

Additionally, embodiments of the present disclosure take into consideration that there is a need to define conditions for a UE to provide a PHR upon an active DL BWP change from a dormant DL BWP to a non-dormant DL BWP on an SCell or upon an activation of an SCell.

Embodiments of the present disclosure also take into consideration that there is a need to determine conditions for a UE to use a previous power adjustment state after an active DL BWP change on an SCell from a dormant DL BWP to a non-dormant DL BWP or after activation of an SCell.

Embodiments of the present disclosure further take into consideration that there is a need to determine a UE procedure for simultaneous PUCCH transmission and PUSCH transmission.

Embodiments of the present disclosure describe power headroom reports for a PUCCH transmission. Embodiments of the present disclosure also describe multiple power headroom reports for PUSCH transmissions or PUCCH transmissions. Embodiments of the present disclosure further describe PHR in response to cell activation or active DL BWP change from a dormant to a non-dormant DL BWP. Additionally, embodiments of the present disclosure describe UCI multiplexing for simultaneous PUSCH and PUCCH transmissions.

Embodiments of the present disclosure describe power headroom reports for a PUCCH transmission. The following examples and embodiments, such as those of FIGS. 8 and 9 describe the power headroom reports for a PUCCH transmission.

Figure 8:
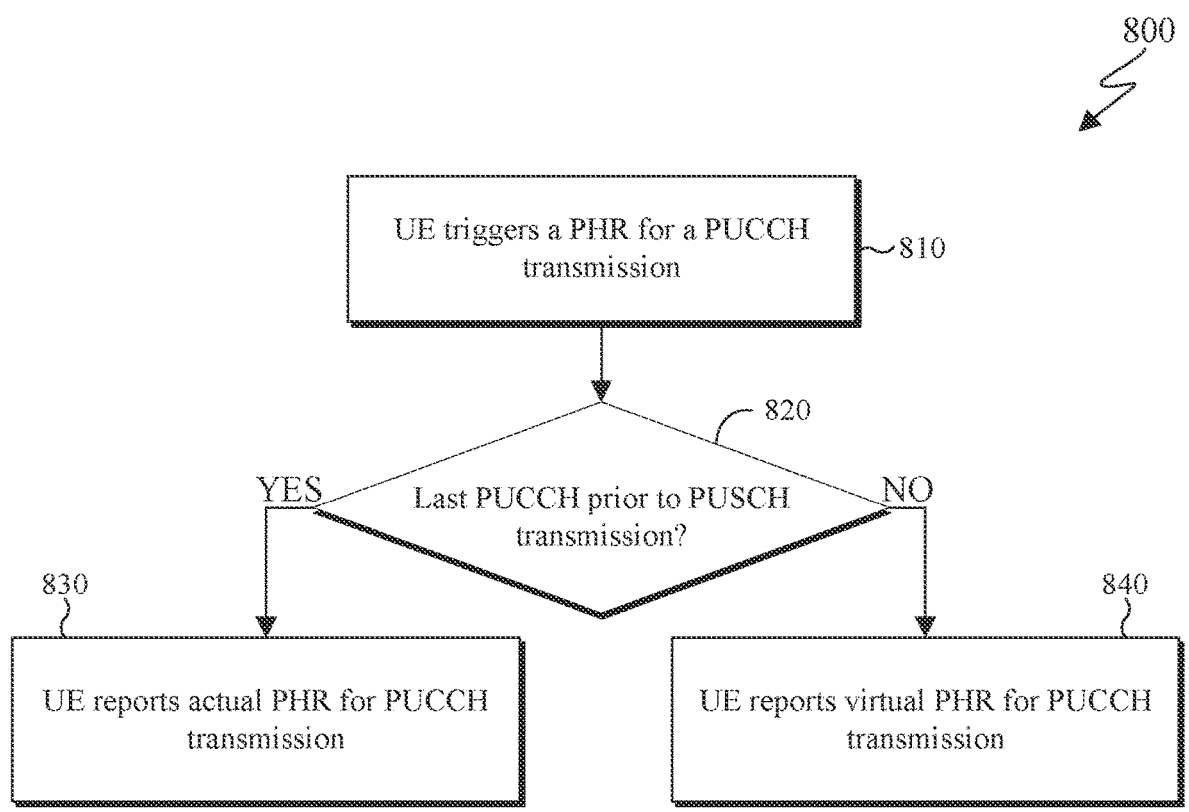
FIG. 8 illustrates an example method for a UE to provide a PHR for a PUCCH transmission according to embodiments of the present disclosure.
Figure 9:
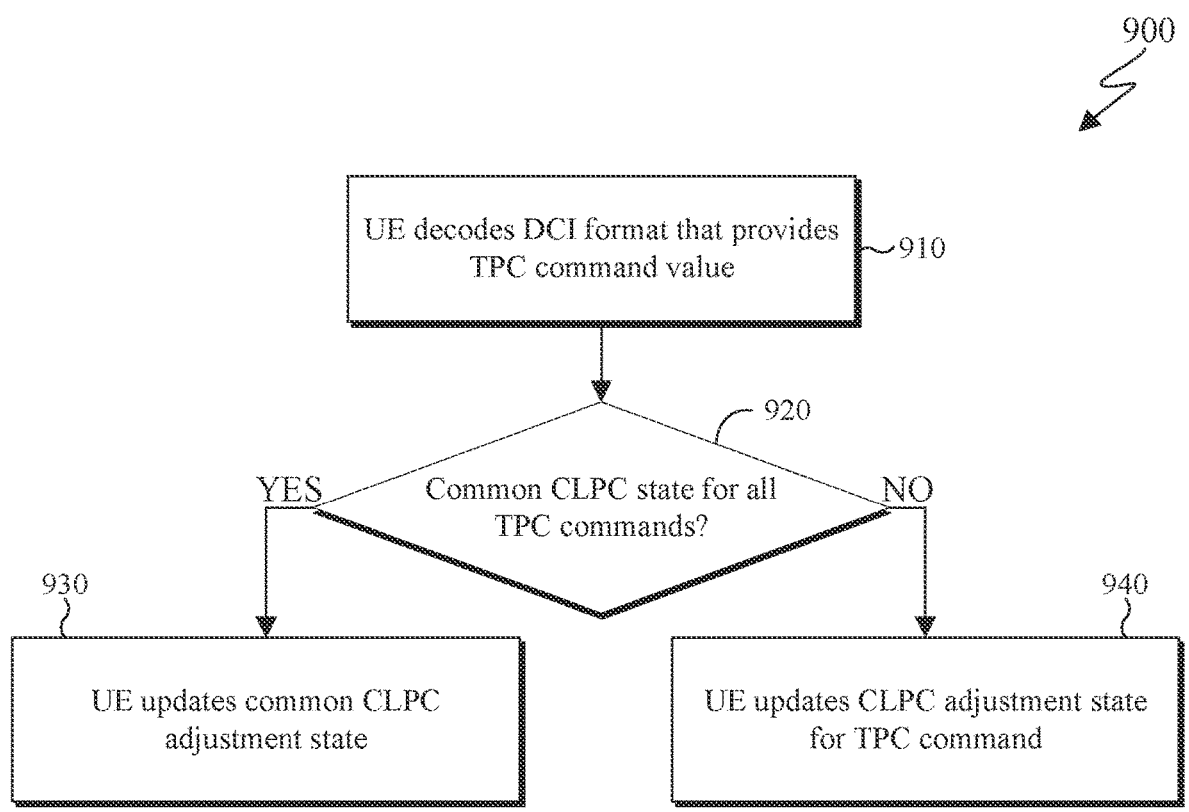
FIG. 9 illustrates an example method for a UE to process transmit power control (TPC) command values in DCI formats according to embodiments of the present disclosure.

FIG. 8 illustrates an example method 800 for a UE to provide a PHR for a PUCCH transmission according to embodiments of the present disclosure. FIG. 9 illustrates an example method 900 for a UE to process TPC command values in DCI formats according to embodiments of the present disclosure. The steps of the method 800 and the method 900 can be performed by any of the UEs 111-118 of FIG. 1, such as the UE 116 of FIG. 3. The method 800 of FIG. 8 and the method 900 of FIG. 9 are for illustration only and other embodiments can be used without departing from the scope of the present disclosure.

A PHR for a PUCCH transmission can be referred to as Type-2 PHR. In certain embodiments, after higher layers at a UE (such as the UE 116) trigger a Type-2 PHR a PUCCH transmission), the UE can provide the Type-2 PHR through a MAC control element in a PUSCH transmission. The PUSCH transmission can be a first PUSCH transmission after the Type-2 PHR is triggered. A Type-2 PHR can be an actual PHR corresponding to an actual PUCCH transmission or a virtual PHR corresponding to a virtual PUCCH transmission. A Type-2 PHR considers only PUCCH transmission on a serving cell, such as a primary cell, without simultaneous PUSCH transmission on the serving cell. The UE can provide a separate Type-1 PHR for PUSCH transmission on the serving cell.

A UE can determine an actual PHR for a PUCCH transmission as described in Equation (5). Additionally, a UE can determine a virtual PHR for a PUCCH transmission as described in Equation (6). It is noted that the notation as used in Equation (5) and Equation (6) are the same as used in Equation (2) and (4).

$$PH_{type2,b,f,c}(i,q_u,q_d,l)=(P_{O\_PUCCH,b,f,c}(q_u)+10 \log_{10}(2^\mu \cdot M_{RB,b,f,c}^{PUCCH}(i))+PL_{b,f,c}(q_d)+\Delta_{F\_PUCCH}(F)+\Delta_{TF\_PUCCH,b,f,c}(i)+g_{b,f,c}(i,l))[dB] \quad (5)$$

$$PH_{type2,b,f,c}(i,q_u,q_d,l)=\tilde{P}_{CMAX,f,c}(i)-(P_{O\_PUCCH,b,f,c}(q_u)+PL_{b,f,c}(q_d)+g_{b,f,c}(i,l))[dB] \quad (6)$$

In certain embodiments, a UE may not have a PUSCH transmission to report a Type-2 PHR after a report is triggered and the UE may have subsequent PUCCH transmissions before a first PUSCH transmission where the UE can report Type-2 PHR. In a first approach, the UE provides an actual Type-2 PHR for a last PUCCH transmission prior to a PUSCH transmission that includes the actual Type-2 PHR. In a second approach, the UE provides only virtual PHR for a PUCCH transmission. In a third approach, the UE can provide an actual Type-2 PHR if the UE has a PUSCH transmission that can be uniquely associated with the Type-2 PHR. For example, the PUCCH transmission triggering the PHR can be a first PUCCH transmission before the PUSCH transmission that provides the PHR; otherwise, the UE provides a virtual Type-2 PHR. The PUSCH transmission can be restricted to be on the primary cell or can be on any cell where the UE is configured/scheduled to transmit PUSCH. In a fourth approach, the UE also indicates a PUCCH format in the Type-2 PHR, for example when the UE is configured PUCCH resources associated with multiple PUCCH formats.

As illustrated in FIG. 8, a UE (such as the UE 116) triggers a PHR for a PUCCH transmission (step 810). In step 820, the UE determines whether the PUCCH transmission is a last PUCCH transmission prior to a PUSCH transmission. When the PUCCH transmission is the last PUCCH transmission prior to a PUSCH transmission, the UE, in step 830 reports an actual PHR for the PUCCH transmission. Alternatively, when the PUCCH transmission is not the last PUCCH transmission prior to a PUSCH transmission, the UE, in step 840, reports a virtual PHR for the PUCCH transmission.

In order to reduce a need for a UE to provide a Type-2 PHR, and also improve tracking to channel medium changes, a UE can use a TPC command associated with a PUCCH transmission and a TPC command associated with a PUSCH transmission to update a same CLPC adjustment state. Therefore, $g_{b,f,c}(i,l)$ can be same as $f_{b,f,c}(i,l)$ on a primary cell and be denoted by a single CLPC adjustment state $h_{b,f,c}(i,l)$ that can be applicable for determining a power of a PUCCH transmission and of a PUSCH transmission on the primary cell. Both a TPC command value provided by a DCI format scheduling a PDSCH reception for adjusting a power of a corresponding PUCCH transmission and a TPC command value provided by a DCI format scheduling a PUSCH transmission can be used in updating a value of $h_{b,f,c}(i,l)$. TPC command values provided by a DCI format that does not schedule a PDSCH reception or a PUSCH transmission can also be used in updating a value of $h_{b,f,c}(i,l)$. The use of a same CLPC adjustment state $h_{b,f,c}(i,l)$ for determining a power of a PUSCH transmission or of a PUCCH transmission can be configured to a UE by higher layers. The value of $h_{b,f,c}(i,l)$ can also be used by a UE to determine a power for an SRS transmission on a primary cell. The use of a single $h_{b,f,c}(i,l)$ CLPC adjustment state enables a serving gNB to derive a Type-2 PHR from a Type-1 PHR when a same RS is used to measure a path-loss used for determining a power of a PUSCH transmission and of a PUCCH transmission at least when $\alpha_{b,f,c}(j)=1$. Also, using a single $h_{b,f,c}(i,l)$ CLPC adjustment state enables a serving gNB to track variations in the channel medium for a UE and adjust a power of PUSCH transmissions or PUCCH transmissions even when the UE does not frequently have one of PUSCH transmissions or PUCCH transmissions.

As illustrated in FIG. 9, a UE decodes a DCI format that includes a field providing a TPC command value (step 910). The DCI format can be a DCI format scheduling PUSCH transmission. The DCI format can be a PUCCH transmission. The DCI format can be a DCI format providing TPC commands values without scheduling a transmission from the UE.

In step 920, the UE determines whether to combine all TPC commands for a corresponding CLPC adjustment state or to separately combine TPC commands associated with PUSCH transmissions and TPC commands associated with PUCCH transmissions. For example, the determination can be based on a configuration the UE receives by higher layers When the TPC commands are combined (as determined in step 720), the UE, in step 930, updates a common CLPC adjustment state. Updating the common CLPC adjustment state, can be based on a TPC command for the CLPC adjustment state regardless of the DCI format that provides the TPC command. Alternatively, in step 940, the UE updates either (i) a CLPC adjustment state associated with PUCCH transmissions or (ii) a CLPC adjustment state associated with PUSCH transmissions. The UE updates a CLPC adjustment state associated with PUCCH transmissions if the TPC command is associated with PUCCH transmissions. The UE updates a CLPC adjustment state associated with PUCCH transmissions if the TPC command is associated with PUSCH transmissions.

If a UE (such as the UE 116) supports simultaneous PUSCH transmission and PUCCH transmission on a cell, such as a primary cell, and the UE would transmit PUSCH and PUCCH when the PHR is triggered, the UE can determine a Type-2A PHR as described in Equation (7). Similarly, if a UE (such as the UE 116) supports simultaneous PUSCH transmission and PUCCH transmission on a cell, such as a primary cell, and the UE would not transmit PUSCH and would transmit PUCCH when the PHR is triggered, the UE can determine a Type-2A PHR as described in Equation (8). It is noted that the notations for Equation (7) and Equation (8) are similar to the notations of Equation (1) and Equation (2). Additionally, the same reference values as described in Equation (4) are used for the PUSCH parameters $P_{O\_PUSCH,b,f,c}(j)$, $\alpha_{b,f,c}(j)$, $PL_{b,f,c}(q_d)$ and $f_{b,f,c}(i,l)$ of Equation (8).

$$PH_{type2,b,f,c}(i, j, q_d, q_u, l) = P_{CMAX,f,c}(i) - 10\log_{10}\left(10^{\left(P_{O\_PUSCH,b,f,c}(j)+10\log_{10}\left(2^\mu \cdot M_{RB,b,f,c}^{PUSCH}(i)\right)+\alpha_{b,f,c}(j)\cdot PL_{b,f,c}(q_d)+\Delta_{TF\_PUSCH,b,f,c}(i)+f_{b,f,c}(i,l)\right)/10} + 10^{\left(P_{O\_PUCCH,b,f,c}(q_u)+10\log_{10}\left(2^\mu \cdot M_{RB,b,f,c}^{PUCCH}(i)\right)+PL_{b,f,c}(q_d)+\Delta_{F\_PUCCH}(F)+\Delta_{TF\_PUCCH,b,f,c}(i)+g_{b,f,c}(i,l)\right)/10}\right) [dB] \quad (7)$$

$$PH_{type2,b,f,c}(i, j, q_d, q_u, l) = P_{CMAX,f,c}(i) - 10\log_{10}\left(10^{\left(P_{O\_PUSCH,b,f,c}(j)+\alpha_{b,f,c}(j)\cdot PL_{b,f,c}(q_d)+f_{b,f,c}(i,l)\right)/10} + 10^{\left(P_{O\_PUCCH,b,f,c}(q_u)+10\log_{10}\left(2^\mu \cdot M_{RB,b,f,c}^{PUCCH}(i)\right)+PL_{b,f,c}(q_d)+\Delta_{F\_PUCCH}(F)+\Delta_{TF,b,f,c}(i)+g_{b,f,c}(i,l)\right)/10}\right) [dB] \quad (8)$$

If a UE supports simultaneous PUSCH transmission and PUCCH transmission on a cell, such as a primary cell, and the UE would not transmit PUSCH and would not transmit PUCCH when the PHR is triggered, the UE can determine a Type-2A PHR as Described in Equation (9). It is noted that the notations for Equation (9) are similar to the notations of Equation (1) and Equation (2).

$$PH_{type2,b,f,c}(i, j, q_d, q_u, l) = \tilde{P}_{CMAX,f,c}(i) - 10\log_{10}\left(10^{\left(P_{O\_PUSCH,b,f,c}(j)+\alpha_{b,f,c}(j)\cdot PL_{b,f,c}(q_d)+f_{b,f,c}(i,l)\right)/10} + 10^{\left(P_{O\_PUCCH,b,f,c}(q_u)+PL_{b,f,c}(q_d)+g_{b,f,c}(i,l)\right)/10}\right) [dB] \quad (9)$$

Here, the same reference values as described in Equation 4 are used for the PUSCH parameters $P_{O\_PUSCH,b,f,c}(j)$, $\alpha_{b,f,c}(j)$, $PL_{b,f,c}(q_d)$ and $f_{b,f,c}(i,l)$. Additionally, the parameter $P_{O\_PUCCH,b,f,c}(q_u)$ is a reference value obtained for $q_u=0$, $PL_{b,f,c}(q_d)$ is obtained from a path-loss reference RS for PUCCH with index 0, and l=0 for $g_{b,f,c}(i,l)$.

Although FIGS. 8 and 9 illustrate the methods 800 and 900 various changes may be made to FIGS. 8 and 9. For example, while the method 800 of FIG. 8 and the method 900 of FIG. 9 are shown as a series of steps, various steps could overlap, occur in parallel, occur in a different order, or occur multiple times. In another example, steps may be omitted or replaced by other steps. For example, steps of the method 800 can be executed in a different order.

Embodiments of the present disclosure also describe multiple power headroom reports for PUSCH transmissions or PUCCH transmissions. The following examples and embodiments, such as those of FIGS. 10 and 11 describe the multiple power headroom reports for PUSCH transmissions or PUCCH transmissions.

Figure 10:
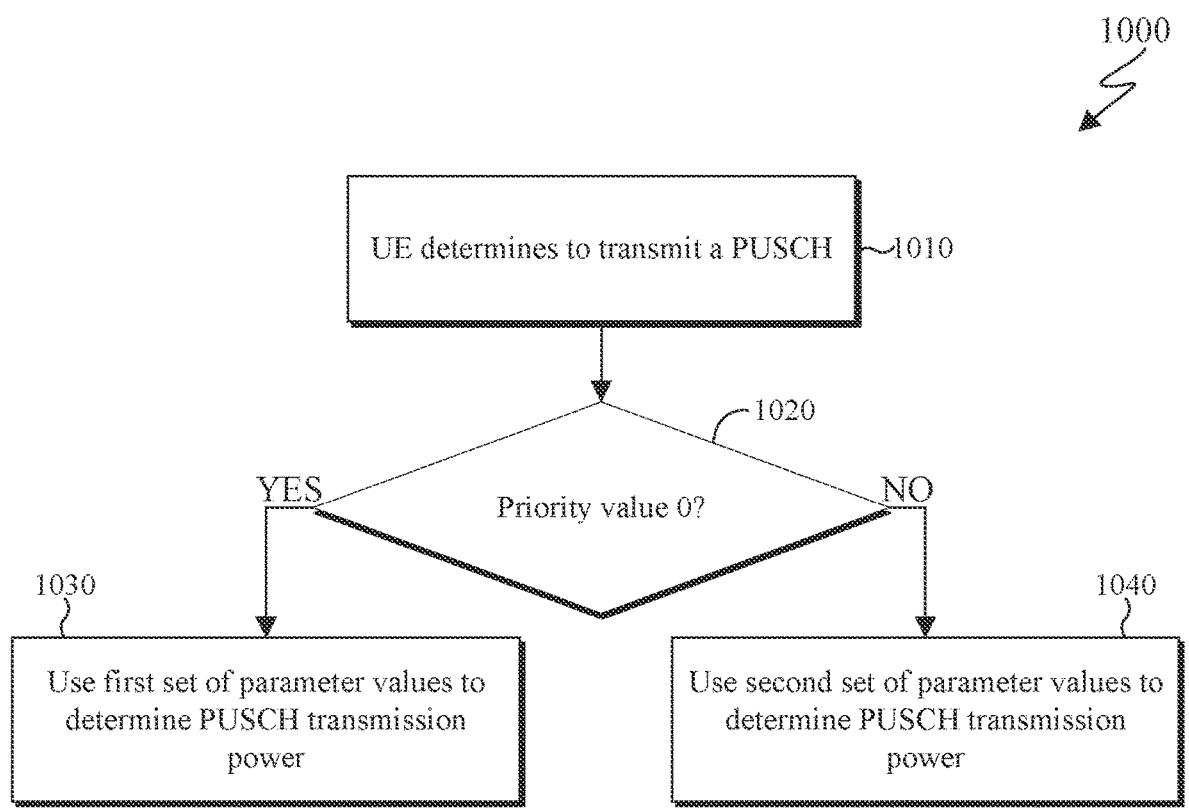
FIG. 10 illustrates an example method for a UE to determine a power for a PUCCH transmission or for a PUSCH transmission based on a corresponding priority value according to embodiments of the present disclosure.
Figure 11:
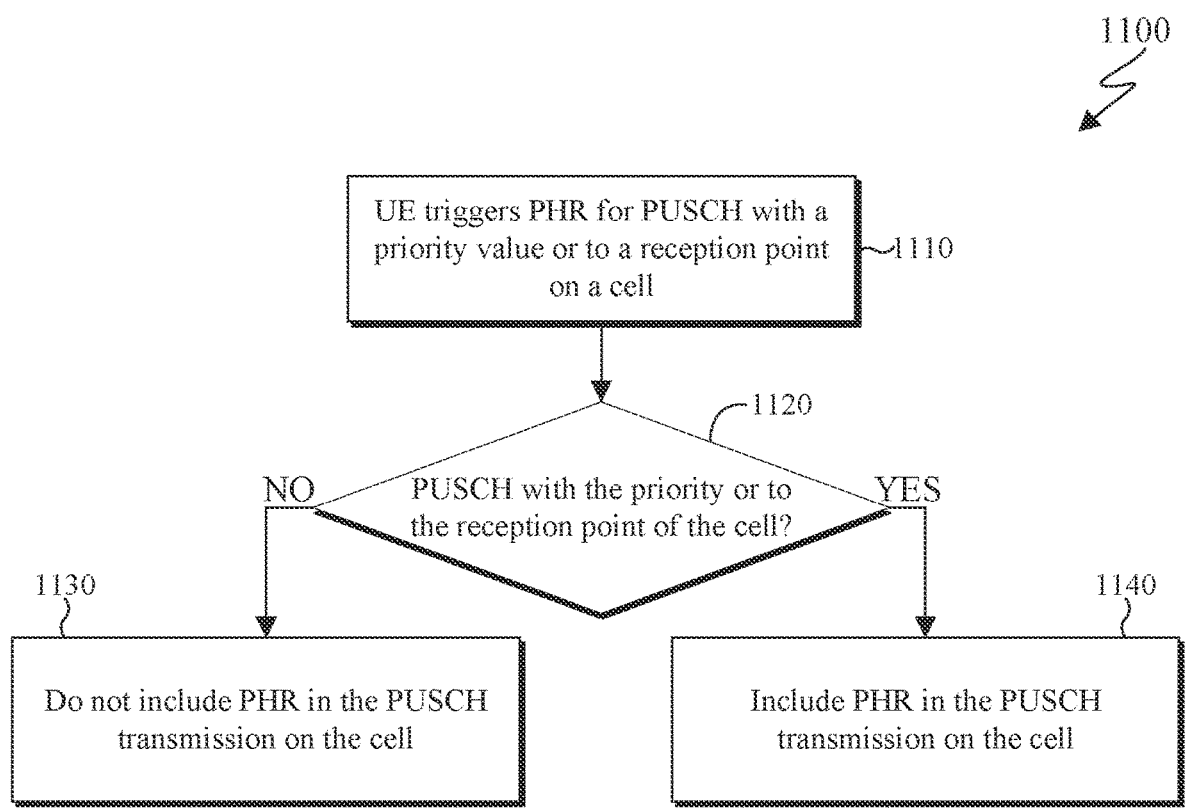
FIG. 11 illustrates an example method for a UE to provide a first PHR for a first PUSCH transmission to a first reception point of a cell and a second PHR for a second PUSCH transmission to a second reception point of a cell according to embodiments of the present disclosure.

FIG. 10 illustrates an example method 1000 for a UE to determine a power for a PUCCH transmission or for a PUSCH transmission based on a corresponding priority value according to embodiments of the present disclosure. FIG. 11 illustrates an example method 1100 for a UE to provide a first PHR for a first PUSCH transmission to a first reception point of a cell and a second PHR for a second PUSCH transmission to a second reception point of a cell according to embodiments of the present disclosure. The steps of the method 1000 and the method 1100 can be performed by any of the UEs 111-118 of FIG. 1, such as the UE 116 of FIG. 3. The method 1000 of FIG. 10 and the method 1100 of FIG. 11 are for illustration only and other embodiments can be used without departing from the scope of the present disclosure.

In certain embodiments, a UE applies different determinations of a PUSCH transmission power depending on a priority value for the PUSCH transmission or depending on a reception point of a serving cell for the PUSCH transmission.

For example, a UE supporting PUSCH transmissions of different priority types, or PUSCH transmissions to different reception points, can be configured or indicated different values for one or more of the following parameters for determining a PUSCH transmission power. The parameters can include (i) $P_{O\_PUSCH,b,f,c}(j)$, (ii) $\alpha_{b,f,c}(j)$, (iii) a path-loss reference RS index, and (iv) $f_{b,f,c}(i,l)$.

In the above example, for two priority values or for two reception points, the UE is provided a first $P_{O\_PUSCH,b,f,c}(j)$ for a PUSCH transmission with priority value 0 or to reception point 0 and a second $P_{O\_PUSCH,b,f,c}(l)$ for a PUSCH transmission with priority value 1 or to reception point 1.

In the above example, for two priority values, the UE uses a first $\alpha_{b,f,c}(j)$ for a PUSCH transmission with priority value 0 or to reception point 0 and uses a second $\alpha_{b,f,c}(j)$ for a PUSCH transmission with priority value 1 or to reception point 1. It is also possible that a second $\alpha_{b,f,c}(j)$ is not provided and then a value of $\alpha_{b,f,c}(j)$ is 1. When the $P_{O\_PUSCH,b,f,c}(j)$ and the $\alpha_{b,f,c}(j)$ values are indicated to the UE, the first and second values of $\alpha_{b,f,c}(j)$ can be jointly indicated with the first and second values of $P_{O\_PUSCH,b,f,c}(j)$ respectively using a same value of a field in a DCI format.

In the above example, for two priority values or for two reception points, the UE is provided a first path-loss reference RS index corresponding to a first RS, such as an SS/PBCH block or a CSI-RS, to measure a first path-loss associated with a PUSCH transmission with priority value 0 or to reception point 0 and a second path-loss reference RS index corresponding to a second RS to measure a second path-loss associated with a PUSCH transmission with priority value 1 or to reception point 1.

In the above example, for two priority values or for two reception points, the UE uses a first CLPC adjustment state $f_{b,f,c,1}(i,l)$ for a PUSCH transmission with priority value 0 or to reception point 0 and a second CLPC adjustment state $f_{b,f,c,2}(i,l)$ for a PUSCH transmission with priority value 1 or to reception point 1.

As illustrated in FIG. 10, the UE is scheduled or configured a PUSCH transmission (step 1010). In step 1020, the UE determines a priority value for a PUSCH transmission. For example, the determination can be based on an indication by a DCI format scheduling the PUSCH transmission or by higher layers in case of a configured-grant PUSCH transmission. When the priority value is a first value, such as zero, the UE, in step 1030, uses a first set of parameter values to determine a power for the PUSCH transmission. Alternatively, when the priority value is a second value (not zero), the UE, in step 1040, uses a second set of parameter values to determine a power for the PUCCH transmission.

The set of parameter values of steps 1030 and 1040 can include a RS for measuring a path-loss and the corresponding path-loss measurement or can include a path-loss compensation factor. For example, a path-loss compensation factor smaller than one is used when the priority value is zero and a path-loss compensation factor equal to one is used when the priority value is one. A same procedure can apply for a PUCCH transmission.

When a UE uses different RS to estimate a path-loss $PL_{b,f,c}(q_d)$, or a different path-loss compensation factor $\alpha_{b,f,c}(j)$, or a different CLPC accumulation state $f_{b,f,c}(i,l)$, for determining a power of PUSCH transmissions with different priority values and the UE includes a Type-1 PHR in a PUSCH transmission with a first priority value or to a first reception point of a serving gNB, the serving gNB cannot determine a PHR for a PUSCH transmission with a second priority value, or to a second reception point, because the serving gNB cannot determine the value of $\alpha_{b,f,c}(j) \cdot PL_{b,f,c}(q_d)$, or the value of $f_{b,f,c}(i,l)$, for the PUSCH transmission of the second priority, or to the second reception point, in order to determine a corresponding PHR.

In a first approach, the UE provides in a PUSCH transmission a first Type-1 PHR corresponding to the PUSCH transmission and a second Type-1 PHR corresponding to the PUSCH transmission of the other priority value or to the other reception point. Different values of $P_{O\_PUSCH,b,f,c}(j)$, or $\alpha_{b,f,c}(j)$, or $PL_{b,f,c}(q_d)$, or $f_{b,f,c}(i,l)$ can be applicable for computing the first Type-1 PHR and the second Type-1 PHR, where the UE uses a value corresponding to a PUSCH transmission of a corresponding priority value or to a corresponding reception point.

In a second approach, the UE provides in a PUSCH transmission a first Type-1 PHR corresponding to the PUSCH transmission and a difference between the second Type-1 PHR and the first Type-1 PHR corresponding to the difference of the corresponding $P_{O\_PUSCH,b,f,c}(j)$ and $\alpha_{b,f,c}(j) \cdot PL_{b,f,c}(q_d)$ values, and including the difference of the corresponding $f_{b,f,c}(i,l)$ values if it is not zero, for the other priority value or to the other reception point.

A PHR for PUSCH transmissions with different priority values or for PUSCH transmissions to different reception points can also have a separate configuration of associated parameters, such as a timer for enabling a new PHR after a previous PHR or a path-loss change value for triggering a PHR. A PHR for a PUSCH transmission with a corresponding priority value or to a corresponding reception point can be provided only in the PUSCH transmission. Such a reporting structure enables to maintain a same reporting structure as when having a single priority value or a single reception point for all PUSCH transmissions by a UE. Alternatively, a PHR for a PUSCH transmission with a corresponding priority value or to a corresponding reception point can also be provided in a PUSCH transmission with a different priority value or to a different reception point.

As shown in FIG. 11, a UE triggers a Type-1 PHR for a PUSCH transmission with a first priority value or to a first reception point of a cell (step 1110). In step 1120, the UE determines whether a PUSCH transmission is with the first priority or to the first reception point of the cell. When the PUSCH transmission is not with the first priority or to the first reception point of the cell, respectively, the UE, in step 1130, does not include the Type-1 PHR in the PUSCH transmission. Alternatively, when the PUSCH transmission is with the first priority or to the first reception point of the cell, respectively, the UE, in step 1140, includes the Type-1 PHR in the PUSCH transmission.

Similar PHR reporting can be used for Type-2 PHR for PUCCH transmissions, or for Type-2A PHR for simultaneous PUSCH and PUCCH transmissions on a primary cell, with different priority values or to different reception points and corresponding descriptions are omitted for brevity.

Although FIGS. 10 and 11 illustrate the methods 1000 and 1100 various changes may be made to FIGS. 10 and 11. For example, while the method 1000 of FIG. 10 and the method 1100 of FIG. 11 are shown as a series of steps, various steps could overlap, occur in parallel, occur in a different order, or occur multiple times. In another example, steps may be omitted or replaced by other steps. For example, steps of the method 1000 can be executed in a different order.

Embodiments of the present disclosure further describe PHR in response to cell activation or active DL BWP change from a dormant to a non-dormant DL BWP. The following examples and embodiments, such as those of FIGS. 12 and 13 describe the PHR in response to cell activation or active DL BWP change from a dormant to a non-dormant DL BWP.

Figure 12:
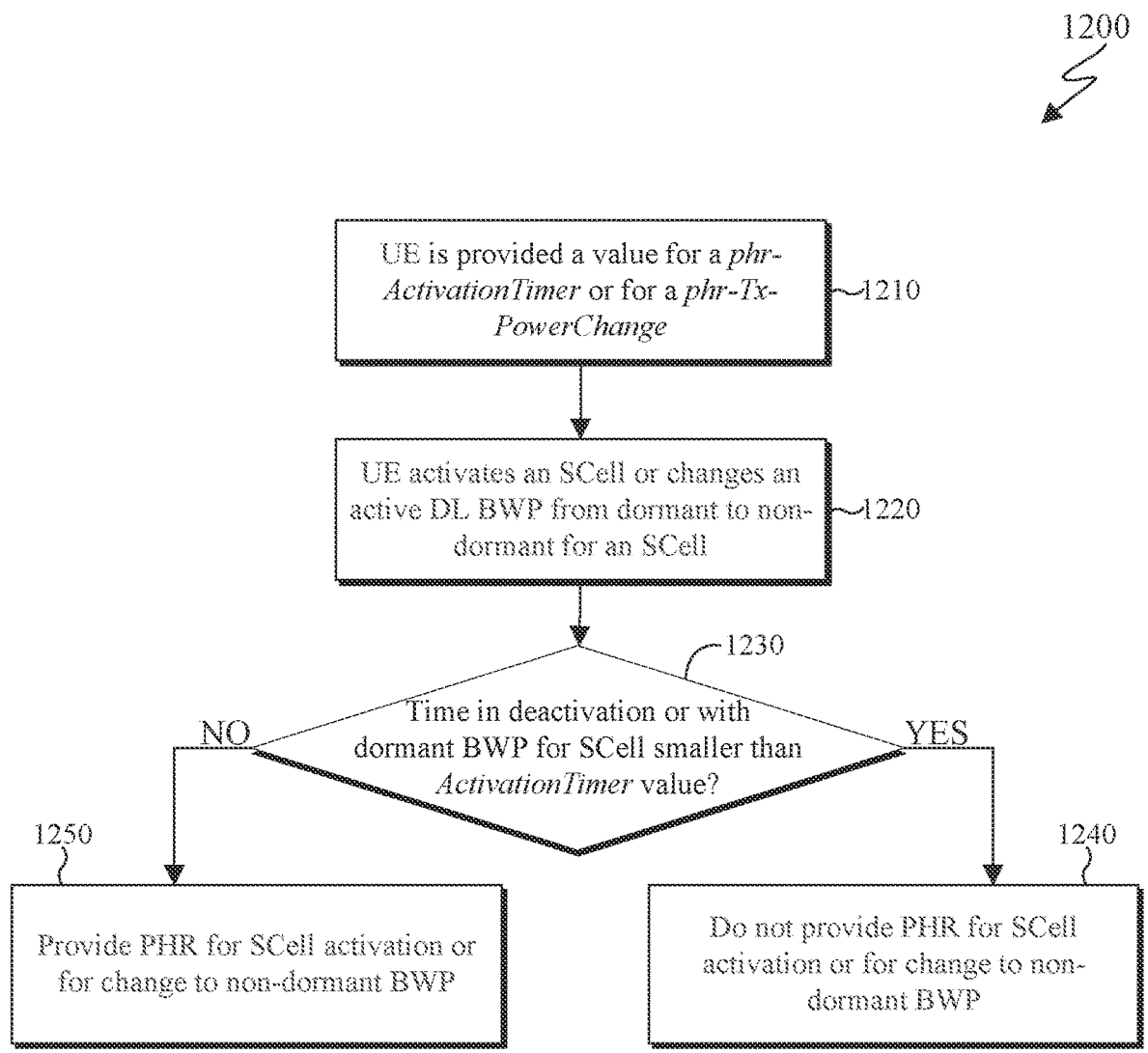
FIG. 12 illustrates an example method for a UE to provide a PHR for a first PUSCH transmission to a first reception point of a cell and a second PHR for a second PUSCH transmission to a second reception point on the cell according to embodiments of the present disclosure.
Figure 13:
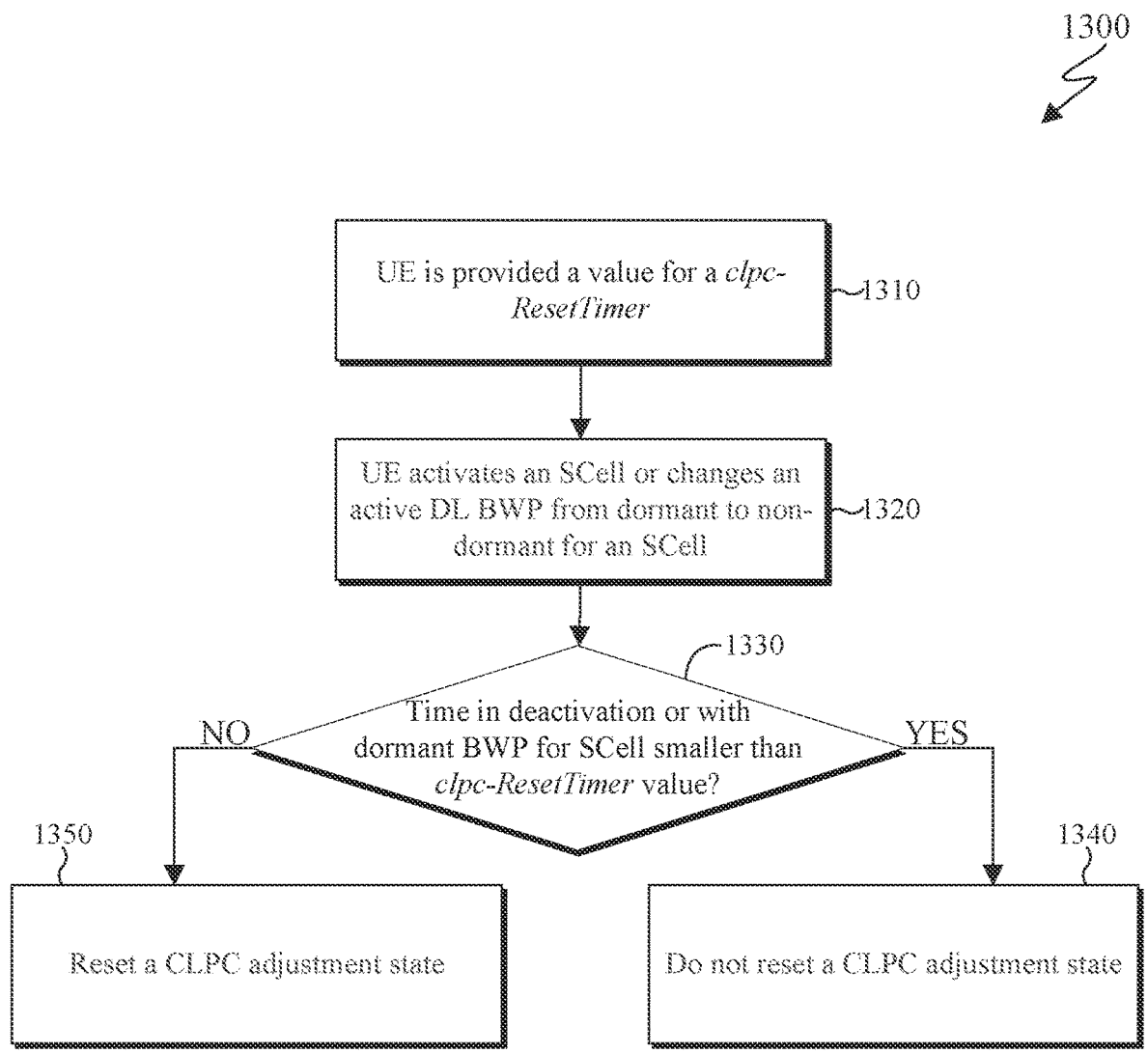
FIG. 13 illustrates an example method for a UE to determine whether to reset a closed loop power control (CLPC) adjustment state according to embodiments of the present disclosure.

FIG. 12 illustrates an example method 1200 for a UE to provide a PHR for a first PUSCH transmission to a first reception point of a cell and a second PHR for a second PUSCH transmission to a second reception point on the cell according to embodiments of the present disclosure. FIG. 13 illustrates an example method 1300 for a UE to determine whether to reset a CLPC adjustment state according to embodiments of the present disclosure. As shown in FIG. 13, the method 1300 describes a UE determining whether to reset a CLPC adjustment upon (i) an SCell activation or (ii) an active DL BWP change from a dormant BWP to a non-dormant BWP for an SCell. The steps of the method 1200 and the method 1300 can be performed by any of the UEs 111-118 of FIG. 1, such as the UE 116 of FIG. 3. The method 1200 of FIG. 12 and the method 1300 of FIG. 13 are for illustration only and other embodiments can be used without departing from the scope of the present disclosure.

In certain embodiments, a UE (such as the UE 116) provide PHR for a PUSCH transmission on an SCell after activation or after an active DL BWP change from a dormant BWP to a non-dormant BWP for the SCell. In the following, only Type-1 PHR is explicitly mentioned but the embodiment is directly applicable to Type-2 PHR, Type-2A PHR, and Type-3 PHR. In certain embodiments, a UE (such as the UE 116) maintains or resets CLPC adjustment states for an SCell after activation or after an active DL BWP change from a dormant BWP to a non-dormant BWP for the SCell.

In a first approach, a UE behavior for whether or not to provide Type-1 PHR for an SCell upon activation of the SCell or upon an active DL BWP change from a dormant DL BWP to a non-dormant DL BWP is configured by higher layers. The configuration can be per cell or per group of cells that are jointly activated or have an active DL BWP change from a dormant DL BWP to a non-dormant DL BWP.

In a second approach, a UE behavior for whether or not to provide Type-1 PHR for an SCell upon activation of the SCell or upon an active DL BWP change from a dormant DL BWP to a non-dormant DL BWP is controlled by a timer. The UE is provided a timer value. For example, the timer value can be in a unit of slots of a given SCS configuration or in absolute time units such as milliseconds. The timer value can be common for all SCells or can be provided per SCell or per group of SCells. The UE resets a timer for an SCell when the SCell is deactivated or the active DL BWP changes from a non-dormant DL BWP to a dormant DL BWP. If the timer is larger than or equal to the timer value when the SCell is activated or when the active DL BWP changes to a non-dormant DL BWP, the UE provides a Type-1 PHR for the SCell; otherwise, the UE does not provide a Type-1 PHR for the SCell.

In a third approach, a UE behavior for whether or not to provide Type-1 PHR for an SCell upon activation of the SCell or upon an active DL BWP change from a dormant DL BWP to a non-dormant DL BWP is controlled by the UE in a similar manner as when the UE operates on a cell that remains activated or on an active non-dormant DL BWP that does not change. For example, the UE can determine conditions that trigger a Type-1 PHR upon SCell activation or upon a DL active BWP change from a dormant BWP to a non-dormant BWP, such as a path-loss change, and determine whether or not to provide a Type-1 PHR. The path-loss change value can be provided to the UE by higher layers.

In a fourth approach, a combination of the previous approaches can apply. For example, a UE can be provided a timer value by a higher layer parameter phr-ActivationTimer and a path-loss change value for an SCell by higher layer parameter phr-Tx-PowerChange. The UE can determine to report a Type-1 PHR when the SCell is activated or when the active DL BWP changes from a dormant DL BWP or a non-dormant DL BWP, when a time between deactivation and activation or between a change of the active DL BWP to dormant DL BWP and to non-dormant DL BWP is larger than or equal to the phr-ActivationTimer timer value and/or when a path-loss change is larger than the phr-Tx-PowerChange value.

As shown in FIG. 12, a UE is provided by higher layers a value for a parameter phr-ActivationTimer or for a parameter phr-Tx-PowerChange (step 1210). In step 1220, the UE receives an indication by a DCI format or by higher layers, such as by a MAC control element, to activate an SCell or to change an active DL BWP for an SCell from a dormant BWP to a non-dormant BWP. In step 1230, the UE determines whether a time the SCell was deactivated or had a dormant BWP as an active DL BWP is smaller than the phr-ActivationTimer value. The UE can apply a similar determination for whether a value of a path-loss change is smaller than the phr-Tx-PowerChange value. When the value is smaller, the UE, in step 1240, does not provide a PHR for the SCell activation or for the active DL BWP change from a dormant BWP to a non-dormant BWP for the SCell. Alternatively, when the value is not smaller, the UE, in step 1250, UE provides a PHR.

Similar approaches as for determining whether or not a UE provides a PHR can apply for determining whether or not a UE maintains CLPC adjustment states for an SCell after activation or after an active DL BWP change from a dormant BWP to a non-dormant BWP for the SCell. For example, a UE behavior for whether or not to maintain CLPC adjustment states for an SCell, after activation or after an active DL BWP change from a dormant BWP to a non-dormant BWP for the SCell, can be configured by higher layers. The configuration can be per cell or per group of cells that are jointly activated or have an active DL BWP change from a dormant DL BWP to a non-dormant DL BWP. For example, a UE can be provided by higher layers a timer value for a parameter clpc-ResetTimer and the UE can determine whether or not to reset CLPC adjustment states depending on whether or not, respectively, a time between deactivation and activation or between a change of the active DL BWP to dormant DL BWP and to non-dormant DL BWP is larger than or equal to the clpc-ResetTimer timer value.

As shown in FIG. 13, a UE is provided by higher layers a value for a parameter clpc-ResetTimer (step 1310). The clpc-ResetTimer parameter can be same as a phr-ActivationTimer parameter. In step 1320, the UE receives an indication by a DCI format or by higher layers (such as by a MAC control element) to activate an SCell or to change an active DL BWP for an SCell from a dormant BWP to a non-dormant BWP. In step 1330, the UE determines whether a time the SCell was deactivated or had a dormant BWP as an active DL BWP is smaller than the clpc-ResetTimer value. When the value is smaller, the UE, in step 1340, does not reset a CLPC adjustment state. Alternatively, when the value is not smaller, the UE, in step 1350, resets a CLPC adjustment state for determining a power of a PUSCH, PUCCH, or SRS transmission on the SCell.

Although FIGS. 12 and 13 illustrate the methods 1200 and 1300 various changes may be made to FIGS. 12 and 13. For example, while the method 1200 of FIG. 12 and the method 1300 of FIG. 13 are shown as a series of steps, various steps could overlap, occur in parallel, occur in a different order, or occur multiple times. In another example, steps may be omitted or replaced by other steps. For example, steps of the method 1200 can be executed in a different order.

Additionally, embodiments of the present disclosure describe UCI multiplexing for simultaneous PUSCH and PUCCH transmissions. The following examples and embodiments, such as those of FIG. 14 describe the UCI multiplexing for simultaneous PUSCH and PUCCH transmissions.

Figure 14:
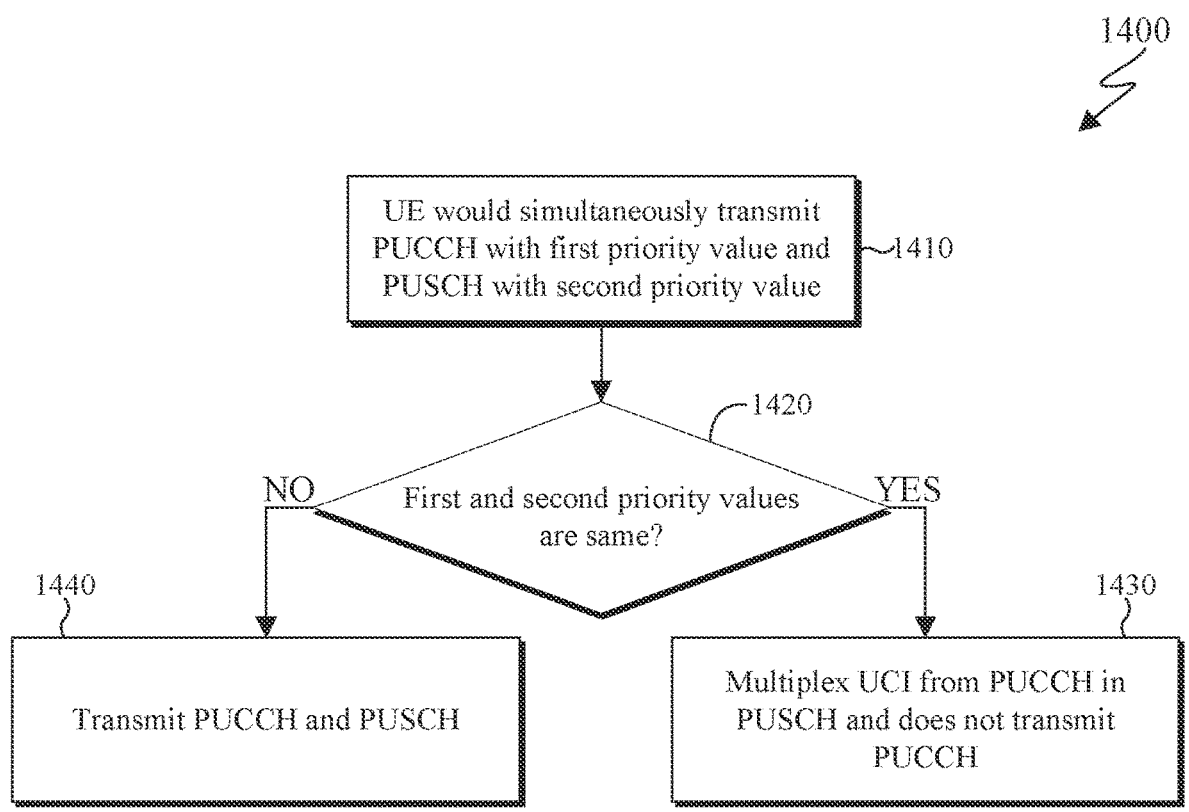
FIG. 14 illustrates an example method for a UE to determine simultaneous transmission of a PUCCH and a PUSCH according to embodiments of the present disclosure.

FIG. 14 illustrates an example method 1400 for a UE to determine simultaneous transmission of a PUCCH and a PUSCH according to embodiments of the present disclosure. The steps of the method 1400 can be performed by any of the UEs 111-118 of FIG. 1, such as the UE 116 of FIG. 3. The method 1400 of FIG. 14 is for illustration only and other embodiments can be used without departing from the scope of the present disclosure.

In certain embodiments, a UE multiplexes UCI in a PUCCH transmission or in a PUSCH transmission when the UE transmits simultaneously the PUCCH and the PUSCH. The transmissions of the PUCCH and the PUSCH can be on a same cell, such as the primary cell, or on different cells.

For example, a UE can be scheduled/configured to simultaneously transmit more than one PUCCHs with different priority values or to different reception points and more than one PUSCHs with different priority values or to different reception points of a serving cell. The notion of simultaneous transmissions means that the transmissions overlap in time. The UE can also be scheduled/configured whether or not to multiplex UCI having a first priority to a PUSCH having a second priority.

In a first scenario, the UE is scheduled to simultaneously transmit two PUCCHs with two corresponding priority values, such as 0 and 1, and one PUSCH. When the PUSCH has a first priority value, the UE multiplexes the UCI from the PUCCH having the first priority value and transmits the PUSCH with the first priority value and the PUCCH with the second priority value. A same UE behavior can apply when the UE is scheduled to simultaneously transmit two PUCCHs to two reception points and one PUSCH to one of the two reception points.

In a second scenario, the UE is scheduled to simultaneously transmit first and second PUCCHs with respective first and second priority values and first and second PUSCHs with respective first and second priority values, wherein the second value is larger than the first value (the second priority is larger/higher than the first priority).

In a first approach for the second scenario, the UE behavior is defined in the specifications of the system operation. The UE multiplexes the UCI of the second PUCCH in the second PUSCH, transmits the second PUSCH, and transmits the first PUCCH and the first PUSCH. Alternatively, the UE multiplexes the UCI of the second PUCCH in the second PUSCH, transmits the second PUSCH, and transmits the first PUCCH and the first PUSCH.

In a second approach for the second scenario, the UE behavior is determined based on a ratio between a number of REs required for UCI multiplexing from a PUCCH in a PUSCH with same priority value over a total number of PUSCH REs, excluding REs used for RS transmission such as DM-RS or PT-RS. The UE selects the multiplexing resulting to a smaller ratio in order to minimize an impact on a transmission of transport blocks (TBs) in the PUSCH. For example, denoting by $N_{RE,0}$ and $N_{RE,1}$ a first total number of first PUSCH REs excluding REs used for RS transmission in the first PUSCH and a second total number of second PUSCH REs excluding REs used for RS transmission in the second PUSCH, and by $N_{UCI,RE,0}$ and $N_{UCI,RE,1}$ a total number of REs required for multiplexing the first and second UCI from the first and second PUCCH in the first and second PUSCH, respectively, the UE multiplexes the first UCI from the first PUCCH in the first PUSCH and does not transmit the first PUCCH if $N_{UCI,RE,0}/N_{RE,0} \leq N_{UCI,RE,1}/N_{RE,1}$; otherwise, the UE multiplexes the second UCI from the second PUCCH in the second PUSCH and does not transmit the second PUCCH. For example, the UE can determine $N_{UCI,RE,0}$ or $N_{UCI,RE,1}$ and can determine $N_{RE,0}$ or $N_{RE,1}$.

In a third approach, a UE prioritizes UCI multiplexing in a PUSCH transmission that is scheduled by a DCI format (DG-PUSCH) over a CG-PUSCH transmission. A reason is that for a PUSCH transmission scheduled by a DCI format, a serving gNB can adjust a corresponding number of resources to account for UCI multiplexing and improve a reception reliability of a TB provided by the CG-PUSCH transmission without penalizing a reception reliability of a TB provided by the DG-PUSCH transmission or the UCI reception reliability. When both first and second PUSCH transmissions are CG-PUSCH transmissions, the first approach or the second approach can be used.

In a fourth approach, for a UE enabled for simultaneous PUCCH and PUSCH transmissions, whether UCI is multiplexed in a PUSCH or in a PUCCH can be indicated, implicitly or explicitly, by a DCI format scheduling a PUSCH transmission. In a first example, the indication can be implicitly provided by the DCI format, for example by an indication to multiplex CSI in the PUSCH transmission, with or without UL-SCH multiplexing. In a second example, a 1-bit field can be introduced in the DCI format to explicitly indicate whether or not the UE should transmit both the PUCCH and the PUSCH or whether the UE should multiplex the UCI from the PUCCH in the PUSCH. The UE may not multiplex a SR in the PUSCH and the UE may not multiplex CSI from the PUCCH in the PUSCH when the UE is indicated to multiplex CSI in the PUSCH by a field in the DCI format scheduling the PUSCH transmission.

When a UE (such as the UE 116) is configured to simultaneously transmit a PUCCH and a PUSCH, the UE transmits only the PUCCH when the PUCCH transmission is with repetitions. When a UE is configured to simultaneously transmit a PUCCH and a PUSCH, the UE transmits both the PUCCH and the PUSCH when the PUSCH transmission is with repetitions. A reason for the different UE behaviors for the two cases is that when a UE transmits a channel with repetitions, the UE typically transmits with maximum power. Also, a UE typically prioritizes power allocation to a PUCCH transmission over a PUSCH transmission. Therefore, when the UE transmits a PUCCH with repetitions, if the UE would also simultaneously transmit a PUSCH, the UE would need to reduce a PUCCH transmission from a maximum one, and that is not beneficial. However, when the UE transmits a PUSCH with repetitions, the UE can transmit a PUCCH without repetitions that may not require a maximum transmission power and use a remaining power to transmit the overlapping PUSCH repetition. An exception can be when the PUCCH transmission includes only CSI and then the UE can prioritize power allocation to the PUSCH transmission and drop the PUCCH transmission at least when the PUSCH transmission includes CSI.

As shown in FIG. 14, a UE would simultaneously transmit a PUCCH with a first priority value and a PUSCH with a second priority value (step 1410). In step 1420, the UE determines whether the first and second priority values are same. When the first and second priority values are same, the UE, in step 1430, multiplexes UCI from the PUCCH in the PUSCH and does not transmit the PUCCH. Alternatively, when the first and second priority values are not same, the UE, in step 1440, transmits the PUCCH and the PUSCH.

Although FIG. 14 illustrates the method 1400 various changes may be made to FIG. 14. For example, while the method 1400 of FIG. 14 is shown as a series of steps, various steps could overlap, occur in parallel, occur in a different order, or occur multiple times. In another example, steps may be omitted or replaced by other steps. For example, steps of the method 1400 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for a user equipment (UE) to provide first uplink control information (UCI), the method comprising:
receiving a configuration enabling transmissions of physical uplink control channels (PUCCHs) and physical uplink shared channels (PUSCHs) that overlap in time;
determining:
a first priority for a first PUCCH and a second priority for a first PUSCH, wherein:
transmissions of the first PUCCH and of the first PUSCH are scheduled to overlap in time, and
the first PUCCH is scheduled to provide the first UCI, and
a number of repetitions for the first PUCCH transmission; and
transmitting:
both the first PUCCH and the first PUSCH when the first priority is larger than the second priority and the number of repetitions is one, wherein the first UCI is included in the first PUCCH, and
only the first PUCCH when the first priority is larger than the second priority and the number of repetitions is more than one.

2. The method of claim 1, further comprising:
determining that a second PUCCH, scheduled to provide a second UCI, has the second priority, wherein:
transmissions of the second PUCCH and of the first PUSCH are scheduled to overlap in time, and
the first priority is larger than the second priority; and
dropping the transmission of the second PUCCH, wherein the second UCI is included in the first PUSCH.

3. The method of claim 1, further comprising:
receiving a downlink control information (DCI) format that includes a field indicating one of:
to transmit both the first PUCCH and the first PUSCH, or
to transmit only the first PUSCH, wherein:
the first priority is larger than the second priority, the number of repetitions is one, and
the field indicates to transmit both the first PUCCH and the first PUSCH.

4. The method of claim 1, further comprising:
receiving:
a first downlink control information (DCI) format, wherein the first DCI format:
schedules a physical downlink shared channel (PDSCH) reception, and
includes a field providing a first transmission power control (TPC) command for the first PUCCH transmission, and
a second DCI format, wherein the second DCI format:
schedules the first PUSCH transmission, and
includes a field providing a second TPC command; and determining a power for the first PUCCH transmission or for the first PUSCH transmission based on a value of the first TPC command and on a value of the second TPC command.

5. The method of claim 1, further comprising:
determining a first power headroom report (PHR) for PUSCH transmissions to a first reception point of a serving cell; and
determining a second PHR for PUSCH transmissions to a second reception point of the serving cell, wherein the first PHR and the second PHR are included in the first PUSCH.

6. The method of claim 5, wherein:
the first PHR corresponds to a first power that is determined using a first path-loss measurement based on a first reference signal, and
the second PHR corresponds to a second power that is determined using a second path-loss measurement based on a second reference signal.

7. The method of claim 5, wherein:
the first PHR corresponds to a first power that is determined using a first closed-loop power control (CLPC) adjustment state based on first transmission power control (TPC) commands, and
the second PHR corresponds to a second power that is determined using a second CLPC adjustment state based on second TPC commands.

8. A user equipment (UE) comprising:
a transceiver configured to receive a configuration enabling transmissions of physical uplink control channels (PUCCHs) and physical uplink shared channels (PUSCHs) that overlap in time; and
a processor operably coupled to the transceiver, the processor configured to determine:
a first priority for a first PUCCH and a second priority for a first PUSCH, wherein:
transmissions of the first PUCCH and of the first PUSCH are scheduled to overlap in time, and
the first PUCCH is scheduled to provide first uplink control information (UCI), and
a number of repetitions for the first PUCCH transmission,
wherein the transceiver is further configured to transmit:
both the first PUCCH and the first PUSCH when the first priority is larger than the second priority and the number or repetitions is one, wherein the first UCI is included in the first PUCCH, and
only the first PUCCH when the first priority is larger than the second priority, and the number of repetitions is more than one.

9. The UE of claim 8, wherein:
the processor is further configured to determine that a second PUCCH, scheduled to provide a second UCI, has the second priority, wherein:
the transmissions of the second PUCCH and of the first PUSCH are scheduled to overlap in time, and
the first priority is larger than the second priority; and
the transceiver is further configured to drop the transmission of the second PUCCH, wherein the second UCI is included in the first PUSCH.

10. The UE of claim 8, wherein:
the transceiver is further configured to receive a downlink control information (DCI) format that includes a field indicating one of:
to transmit both the first PUCCH and the first PUSCH, or
to transmit only the first PUSCH, wherein:

the first priority is larger than the second priority, the number of repetitions is one, and the field indicates to transmit both the first PUCCH and the first PUSCH.

11. The UE of claim 8, wherein:

the transceiver is further configured to receive:
- a first downlink control information (DCI) format, wherein the first DCI format:
  - schedules a physical downlink shared channel (PDSCH) reception, and
  - includes a field providing a first transmission power control (TPC) command for the first PUCCH transmission, and
- a second DCI format, wherein the second DCI format:
  - schedules the first PUSCH transmission, and
  - includes a field providing a second TPC command; and the processor is further configured to determine a power for the first PUCCH transmission or for the first PUSCH transmission based on a value of the first TPC command and on a value of the second TPC command.

12. The UE of claim 8, wherein the processor is further configured to determine:
- a first power headroom report (PHR) for PUSCH transmissions to a first reception point of a serving cell, and
- a second PHR for PUSCH transmissions to a second reception point of the serving cell, wherein the first PHR and the second PHR are included in the first PUSCH.

13. The UE of claim 12, wherein:
- the first PHR corresponds to a first power that is determined using a first path-loss measurement based on a first reference signal, and
- the second PHR corresponds to a second power that is determined using a second path-loss measurement based on a second reference signal.

14. The UE of claim 12, wherein:
- the first PHR corresponds to a first power that is determined using a first closed-loop power control (CLPC) adjustment state based on first transmission power control (TPC) commands, and
- the second PHR corresponds to a second power that is determined using a second CLPC adjustment state based on second TPC commands.

15. A base station comprising:
- a transceiver configured to transmit a configuration enabling receptions of physical uplink control channels (PUCCHs) and physical uplink shared channels (PUSCHs) that overlap in time; and
- a processor operably coupled to the transceiver, the processor configured to determine:
  - a first priority for a first PUCCH and a second priority for a first PUSCH, wherein:
    - receptions of the first PUCCH and of the first PUSCH are scheduled to overlap in time, and
    - the first PUCCH is scheduled to provide first uplink control information (UCI), and
  - a number of repetitions for the first PUCCH reception, wherein the transceiver is further configured to receive:
- both the first PUCCH and the first PUSCH when the first priority is larger than the second priority and the number of repetitions is one, wherein first UCI is included in the first PUCCH, and
- only the first PUCCH when the first priority is larger than the second priority and the number of repetitions.

16. The base station of claim 15, wherein:

the processor is further configured to determine that a second PUCCH, scheduled to provide a second UCI, has the second priority, wherein:
- the receptions of the second PUCCH and of the first PUSCH are scheduled to overlap in time, and
- the first priority is larger than the second priority; and the transceiver is further configured to drop the reception of the second PUCCH, wherein the second UCI is included in the first PUSCH.

17. The base station of claim 15, wherein:

the transceiver is further configured to transmit a downlink control information (DCI) format that includes a field indicating one of:
- reception of both the first PUCCH and the first PUSCH, or
- reception of only the first PUSCH, wherein:
  - the first priority is larger than the second priority, the number of repetitions is one, and
  - the field indicates reception of both the first PUCCH and the first PUSCH.

18. The base station of claim 15, wherein the transceiver is further configured to receive:
- a first power headroom report (PHR) for PUSCH receptions at a first reception point of a serving cell, and
- a second PHR for PUSCH receptions at a second reception point of the serving cell, wherein the first PHR and the second PHR are included in the first PUSCH.

19. The base station of claim 18, wherein:

the transceiver is further configured to transmit a first reference signal (RS) and a second RS,
the first PHR corresponds to a first power associated with the first RS, and
the second PHR corresponds to a second power associated with the second RS.

20. The base station of claim 18, wherein:

the transceiver is further configured to transmit physical downlink control channels (PDCCHs),
the PDCCHs provide downlink control information (DCI) formats that include first and second transmission power control (TPC) commands,
the first PHR corresponds to a first power associated with the first TPC commands, and
the second PHR corresponds to a second power associated with the second TPC commands.

* * * * *